(12) United States Patent
Woo et al.

(10) Patent No.: US 12,423,050 B2
(45) Date of Patent: Sep. 23, 2025

(54) MULTIPLE-DEVICE SETUP

(71) Applicant: Sonos, Inc., Santa Barbara, CA (US)

(72) Inventors: Sein Woo, Somerville, MA (US); Liesbeth van den Berg, Medford, MA (US); Roy Pollock, Santa Barbara, CA (US)

(73) Assignee: Sonos, Inc., Goleta, CA (US)

( * ) Notice: Subject to any disclaimer, the term of this patent is extended or adjusted under 35 U.S.C. 154(b) by 0 days.

(21) Appl. No.: 18/675,113

(22) Filed: May 27, 2024

(65) Prior Publication Data

US 2025/0028499 A1 Jan. 23, 2025

Related U.S. Application Data

(63) Continuation of application No. 18/150,826, filed on Jan. 6, 2023, now Pat. No. 11,995,374, which is a continuation of application No. 17/390,189, filed on Jul. 30, 2021, now Pat. No. 11,550,537, which is a continuation of application No. 16/422,431, filed on May 24, 2019, now Pat. No. 11,080,000, which is a continuation of application No. 14/988,524, filed on Jan. 5, 2016, now Pat. No. 10,303,422.

(51) Int. Cl.
| | |
|---|---|
| *G06F 3/048* | (2013.01) |
| *G06F 3/16* | (2006.01) |
| *H04N 21/43* | (2011.01) |
| *H04N 21/436* | (2011.01) |
| *H04N 21/439* | (2011.01) |
| *H04N 21/485* | (2011.01) |

(52) U.S. Cl.
CPC ............. *G06F 3/162* (2013.01); *G06F 3/165* (2013.01); *H04N 21/4307* (2013.01); *H04N 21/43076* (2020.08); *H04N 21/43615* (2013.01); *H04N 21/439* (2013.01); *H04N 21/4852* (2013.01)

(58) Field of Classification Search
CPC ... G06F 3/162; G06F 3/165; H04N 21/43076; H04N 21/4307; H04N 21/43615; H04N 21/439; H04N 21/4852
See application file for complete search history.

(56) References Cited

U.S. PATENT DOCUMENTS

| | | | |
|---|---|---|---|
| 9,940,091 B2* | 4/2018 | Beckhardt | H04R 5/04 |
| 2015/0198938 A1* | 7/2015 | Steele | B25J 9/1689 |
| | | | 700/275 |
| 2016/0073197 A1* | 3/2016 | Hammer | H04W 12/50 |
| | | | 381/80 |
| 2016/0073250 A1* | 3/2016 | Moore | H04L 67/51 |
| | | | 370/338 |

\* cited by examiner

*Primary Examiner* — Mahelet Shiberou
(74) *Attorney, Agent, or Firm* — Akerman LLP

(57) ABSTRACT

An example implementation may involve a media playback system detecting two or more playback devices of a given type. The implementation may further involve transmitting, to a particular playback device of the detected playback devices, an instruction that causes the particular playback device to emit a given sound. The implementation may also involve receiving an identification of the particular playback device and displaying, via a graphical interface, one or more prompts to join the particular playback device into the media playback system.

20 Claims, 28 Drawing Sheets

MULTIPLE-DEVICE SETUP

CROSS REFERENCE TO RELATED APPLICATIONS

This application is a continuation of U.S. application Ser. No. 18/150,826 titled "Multiple-Device Setup," filed on Jan. 6, 2023, and currently pending; U.S. application Ser. No. 18/150,826 is a continuation of U.S. application Ser. No. 17/390,189 titled "Multiple-Device Setup," filed on Jul. 30, 2021, and issued as U.S. Pat. No. 11,550,537 on Jan. 10, 2023; U.S. application Ser. No. 17/390,189 is a continuation of U.S. application Ser. No. 16/422,431 titled "Multiple-Device Setup," filed on May 24, 2019, and issued as U.S. Pat. No. 11,080,000 on Aug. 3, 2021; U.S. application Ser. No. 16/422,431 is a continuation of U.S. application Ser. No. 14/988,524 titled "Multiple-Device Setup," filed Jan. 5, 2016, and issued as U.S. Pat. No. 10,303,422 on May 28, 2019. This application is also related to U.S. application Ser. No. 14/988,534 titled "Intelligent Group Identification," filed on Jan. 5, 2015, and issued as U.S. Pat. No. 10,284,980 on May 7, 2019. The entire contents of U.S. application Ser. Nos. 18/150,826; 17/390,189; 16/422,431; 14/988,524; and 14/988,534 are incorporated by reference herein.

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1:
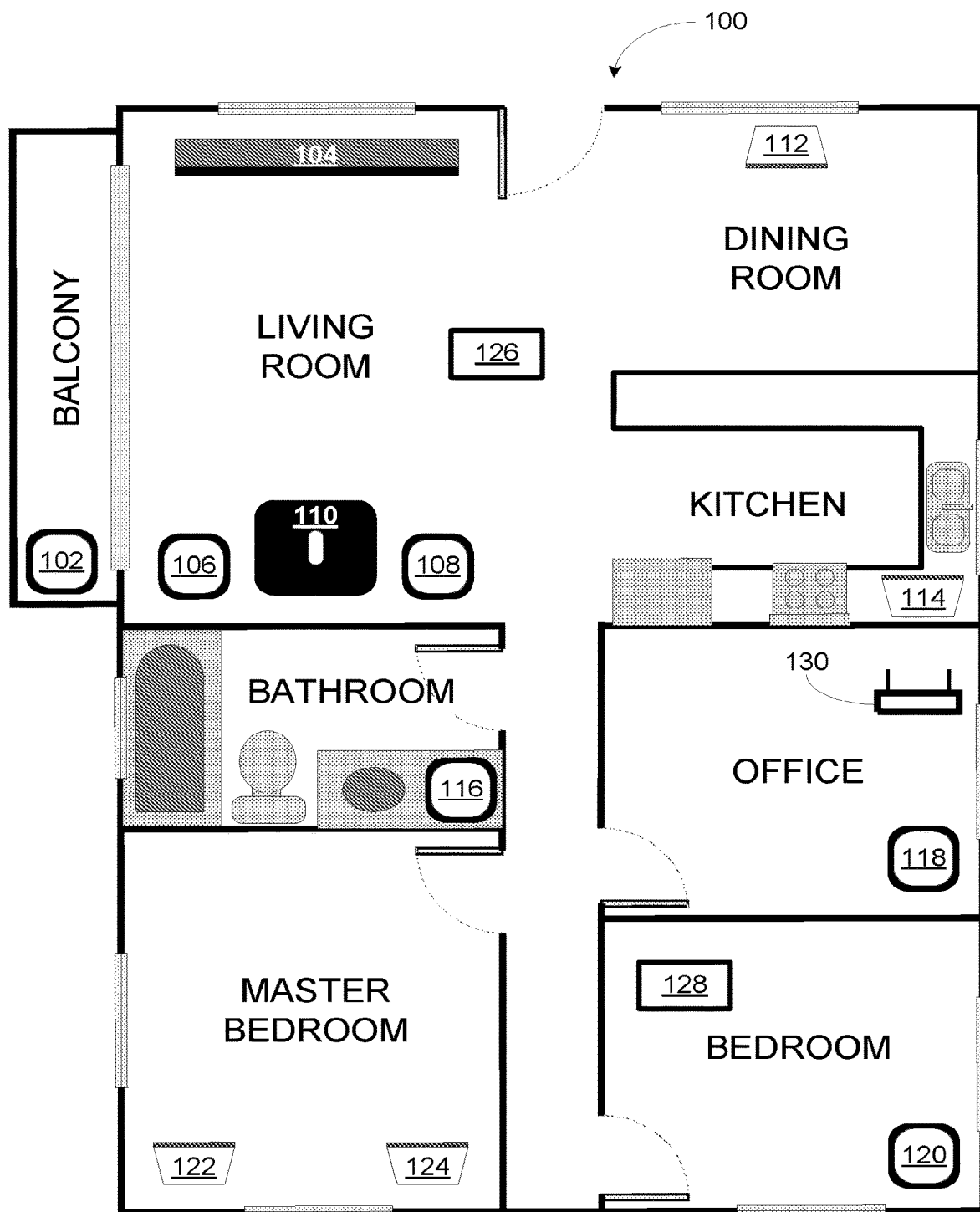
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

Embodiments described herein involve, inter alia, techniques to facilitate configuration of one or more playback devices into a media playback system. Some example media playback system may include one or more interconnected devices (e.g., one or more playback device to playback media and/or one or more control device to control playback by the one or more playback devices). Setup of such media playback systems may involve forming a new media playback system with one or more playback devices or adding additional playback devices to an existing media playback system, among other examples. Example techniques described herein may facilitate such operations.

Some example setup procedures contemplated herein may be fully or partially automated, which may improve user experience by reducing time to setup, among other possible benefits. For instance, some playback devices may support one or more protocols, such as APPLE® Wireless Accessory Configuration (WAC), which facilitate a playback device joining a network by which devices of a media playback system are interconnected. Such protocols may involve a message exchange by which a device of a media playback system (e.g., a control device, such as an APPLE® IPHONE® or other control device) detects a message (e.g., a beacon message) from a new or otherwise unconfigured playback device and provides networking information (e.g., a service set identifier and/or a security key of a network) to the playback device. Upon receiving such networking information, a playback device may use the networking information to connect to the media playback system via the network.

In some instances, multiple similar playback devices (e.g., two devices of the same model) may be formed into a media playback system or added to an existing media playback system at around the same time. After being powered on, such devices may transmit a beacon message. A media playback system may detect such playback devices by way of these messages and assist in joining one or more of these multiple playback devices to the media playback system, perhaps by sharing networking information, as noted above.

To identify which of the two or more playback devices to setup first, the media playback system may instruct a given one of the multiple playback devices to emit a sound. Emitting the sound may distinguish the given playback device from other unconfigured devices of the media playback system and facilitate identifying the given playback device. For instance, after emitting the sound, the media playback system may detect that a certain input (e.g., a button press) was provided on the given playback device. Alternatively, the media playback system may receiving input indicating a serial number of the given playback device (e.g., the playback device that emitted the sound) and distinguish the given playback device based on its serial number.

In some example media playback systems, playback devices may be configured into respective roles. For example, devices of a media playback system may be setup as respective zones, which might correspond to rooms of a home or office (e.g., a Kitchen zone, a Living Room zone, and/or a Bedroom zone, among other examples). Further, some zones may include two or more playback devices that are bonded together as a functional unit (i.e., a bonded zone), such as a stereo pair or surround sound configuration. Yet further, two or more zones may be combined into a zone group, among other possible configurations.

Example techniques described herein may facilitate assigning new or otherwise unconfigured playback devices into zones based on the new devices' compatibility with existing playback devices of a media playback system and/or with one another. For instance, when adding a playback device of a particular type (e.g., model) to a media playback system, a control device of the media playback system may suggest bonding that playback device with another playback device of that particular type to form a stereo pair. As another example, when adding a sound bar or other device that is compatible with surround sound configurations to a media playback system, the media playback system may suggest bonding that device with other playback devices that together form all or part of a surround sound configuration (e.g., a 2, 2.1, 3, 3.1, 5.0, 5.1, 7, 7.1, or other multiple-channel surround sound configuration). By suggesting such groupings, techniques described herein may hasten setup of the media playback system into a user's desired configuration, among other possible benefits.

Within examples, a media playback system may suggest or otherwise facilitate grouping of certain playback devices via a control interface. For instance, after identifying a new device, a control device may display a control interface to guide setup of that new device. Such a control interface may prompt the user to indicate how the new playback device is to be used within the media playback system (e.g., as a standalone device or as part of some grouping of devices). For instance, the control interface may identify configurations (e.g., groupings) that are compatible with the new playback device (possibly in combination with other new or existing playback devices of the media playback system). In some cases, where a bonded or grouped configuration is selected for the new playback device, the control interface may determine that more than one other playback device is compatible with forming that configuration with the new playback device, and prompt the user to indicate which of these devices should become part of the configuration with the new playback device. As described below, example control interfaces contemplated herein may facilitate setup in other ways as well.

As noted above, in some implementations, playback devices of a media playback system may be configured into respective zones or other designations (e.g., rooms). A control interface of the media playback system, such as the example control interfaces noted above, may display an interface (or a portion of an interface) that indicates the zones of the media playback system. Such an interface may provide controls to select a given zone for playback control of that zone. Where one or more unconfigured playback devices have been identified by the media playback system, the interface may also indicate the unconfigured devices. For instance, an example interface may list the zones of a given media playback system and unconfigured playback devices detected by that media playback system. Example interfaces that indicate both configured and unconfigured playback devices may facilitate configuration of the unconfigured (and/or the configured) playback devices, perhaps by indicating available playback devices.

As noted above, example techniques may involve identifying a playback device. In one aspect, a method is provided. The method may involve detecting two or more playback devices of a given type. The method may further involve transmitting, to a particular playback device of the detected playback devices, an instruction that causes the particular playback device to emit a given sound. The method may also involve receiving an identification of the particular playback device and displaying, via a graphical interface, one or more prompts to join the particular playback device into the media playback system.

In another aspect, a device is provided. The device includes a network interface, at least one processor, a data storage, and program logic stored in the data storage and executable by the at least one processor to perform operations. The operations may include detecting two or more playback devices of a given type. The operations may further include transmitting, to a particular playback device of the detected playback devices, an instruction that causes the particular playback device to emit a given sound. The operations may also include receiving an identification of the particular playback device and displaying, via a graphical interface, one or more prompts to join the particular playback device into the media playback system.

In yet another aspect, a non-transitory computer readable memory is provided. The non-transitory computer readable memory has stored thereon instructions executable by a computing device to cause the computing device to perform operations. The operations may include detecting two or more playback devices of a given type. The operations may further include transmitting, to a particular playback device of the detected playback devices, an instruction that causes the particular playback device to emit a given sound. The operations may also include receiving an identification of the particular playback device and displaying, via a graphical interface, one or more prompts to join the particular playback device into the media playback system.

Further example techniques may involve identifying and/or suggesting one or more playback device groupings. In one aspect, a method is provided. The method may involve receiving one or more messages indicating that a first playback device is available for configuration into a zone of a media playback system. The method may further involve identifying one or more second playback devices that are connected to a network and determining that the first playback device and the one or more second playback devices are compatible with one or more bonded zone configurations. The method may also involve detecting selection of a bonded zone configuration from among the one or more compatible bonded zone configurations and displaying an indication of one or more particular second playback devices that are compatible with the selected bonded zone configuration. The method may involve detecting selection of at least one particular second playback device from among the one or more particular second playback devices that are compatible with the selected bonded zone configuration and causing the first playback device to form the selected bonded zone configuration with the selected at least one particular second playback device.

In another aspect, a device is provided. The device includes a network interface, at least one processor, a data storage, and program logic stored in the data storage and executable by the at least one processor to perform operations. The operations may include receiving one or more messages indicating that a first playback device is available for configuration into a zone of a media playback system. The operations may further include identifying one or more second playback devices that are connected to a network and determining that the first playback device and the one or more second playback devices are compatible with one or more bonded zone configurations. The operations may also include detecting selection of a bonded zone configuration from among the one or more compatible bonded zone configurations and displaying an indication of one or more particular second playback devices that are compatible with the selected bonded zone configuration. The operations may include detecting selection of at least one particular second playback device from among the one or more particular second playback devices that are compatible with the selected bonded zone configuration and causing the first playback device to form the selected bonded zone configuration with the selected at least one particular second playback device.

In yet another aspect, a non-transitory computer readable memory is provided. The non-transitory computer readable memory has stored thereon instructions executable by a computing device to cause the computing device to perform operations. The operations may include receiving one or more messages indicating that a first playback device is available for configuration into a zone of a media playback system. The operations may further include identifying one or more second playback devices that are connected to a network and determining that the first playback device and the one or more second playback devices are compatible with one or more bonded zone configurations. The operations may also include detecting selection of a bonded zone configuration from among the one or more compatible bonded zone configurations and displaying an indication of one or more particular second playback devices that are compatible with the selected bonded zone configuration. The operations may include detecting selection of at least one particular second playback device from among the one or more particular second playback devices that are compatible with the selected bonded zone configuration and causing the first playback device to form the selected bonded zone configuration with the selected at least one particular second playback device.

It will be understood by one of ordinary skill in the art that this disclosure includes numerous other embodiments. It will be understood by one of ordinary skill in the art that this disclosure includes numerous other embodiments. While some examples described herein may refer to functions performed by given actors such as "users" and/or other entities, it should be understood that this description is for purposes of explanation only. The claims should not be interpreted to require action by any such example actor unless explicitly required by the language of the claims themselves.

II. Example Operating Environment

FIG. 1 illustrates an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
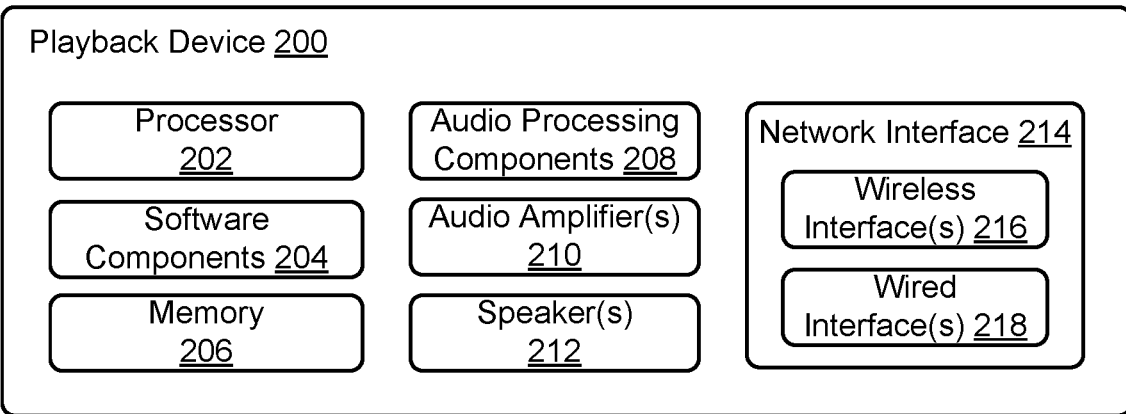
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, and a network interface 214 including wireless interface(s) 216 and wired interface(s) 218. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
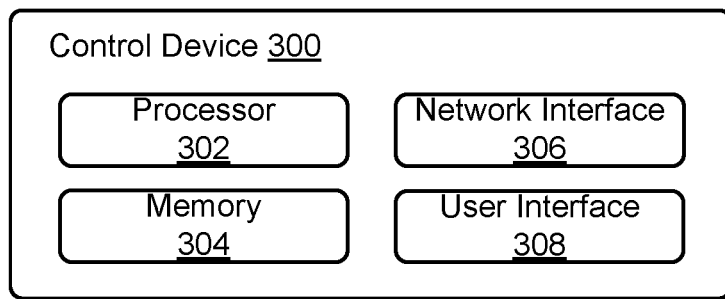
FIG. 3 shows a functional block diagram of an example control device.

FIG. 3 shows a functional block diagram of an example control device 300 that may be configured to be one or both of the control devices 126 and 128 of the media playback system 100. Control device 300 may also be referred to as a controller 300. As shown, the control device 300 may include a processor 302, memory 304, a network interface 306, and a user interface 308. In one example, the control device 300 may be a dedicated controller for the media playback system 100. In another example, the control device 300 may be a network device on which media playback system controller application software may be installed, such as for example, an iPhone™, iPad™ or any other smart phone, tablet or network device (e.g., a networked computer such as a PC or Mac™)

The processor 302 may be configured to perform functions relevant to facilitating user access, control, and configuration of the media playback system 100. The memory 304 may be configured to store instructions executable by the processor 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Figure 4:
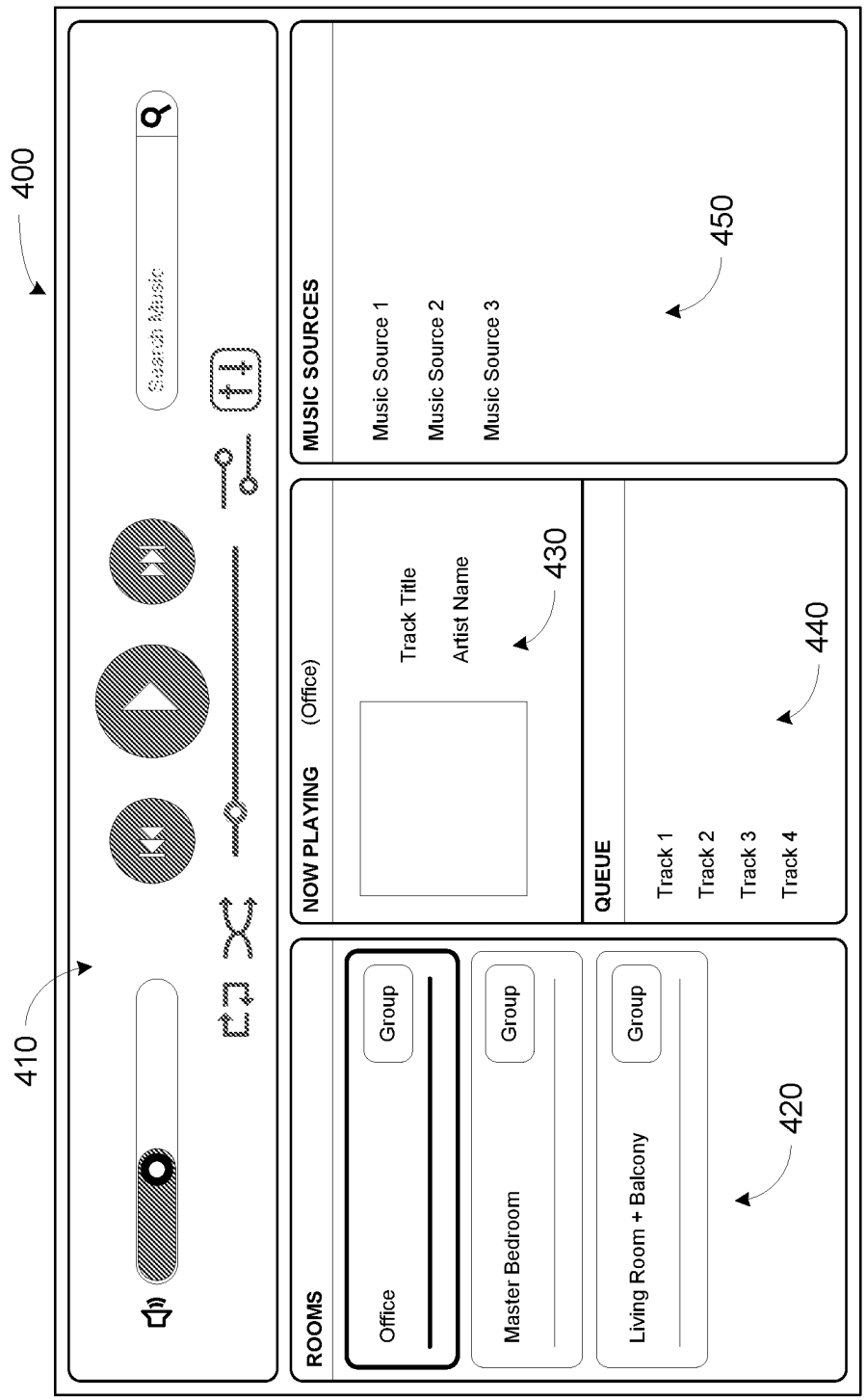
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400A are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400A.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400A of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device. Playback of such a playback queue may involve one or more playback devices playing back media items of the queue, perhaps in sequential or random order.

The audio content sources region 450 may include graphical representations of selectable audio content sources from which audio content may be retrieved and played by the selected playback zone or zone group. Discussions pertaining to audio content sources may be found in the following section.

Figure 5:
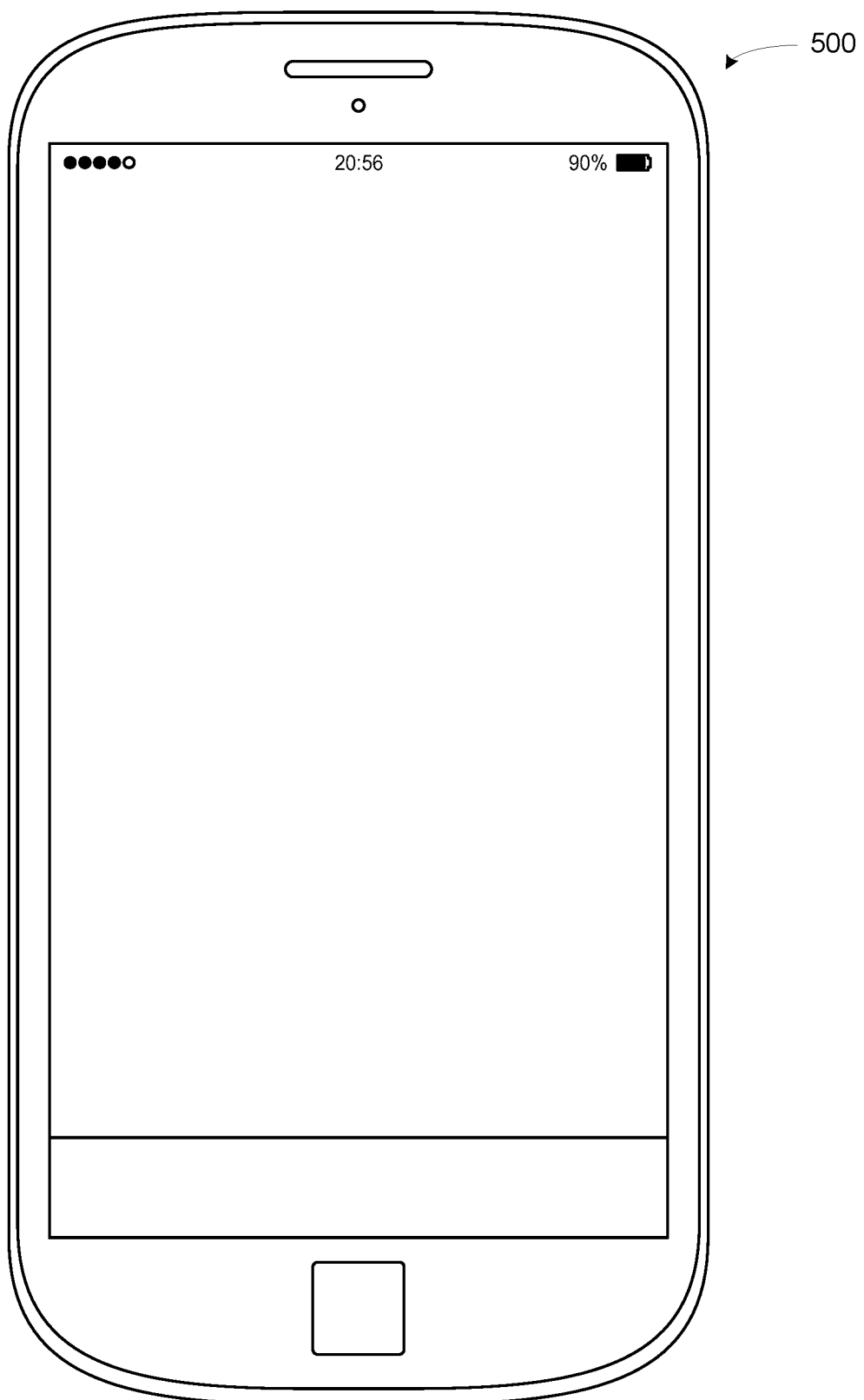
FIG. 5 shows an example control device.

FIG. 5 depicts a smartphone 500 that includes one or more processors, a tangible computer-readable memory, a network interface, and a display. Smartphone 500 might be an example implementation of control device 126 or 128 of FIG. 1, or control device 300 of FIG. 3, or other control devices described herein. By way of example, reference will be made to smartphone 500 and certain control interfaces, prompts, and other graphical elements that smartphone 500 may display when operating as a control device of a media playback system (e.g., of media playback system 100). Within examples, such interfaces and elements may be displayed by any suitable control device, such as a smartphone, tablet computer, laptop or desktop computer, personal media player, or a remote control device.

While operating as a control device of a media playback system, smartphone 500 may display one or more controller interface, such as controller interface 400. Similar to playback control region 410, playback zone region 420, playback status region 430, playback queue region 440, and/or audio content sources region 450 of FIG. 4, smartphone 500 might display one or more respective interfaces, such as a playback control interface, a playback zone interface, a playback status interface, a playback queue interface, and/or an audio content sources interface. Example control devices might display separate interfaces (rather than regions) where screen size is relatively limited, such as with smartphones or other handheld devices.

d. Example Audio Content Sources

As indicated previously, one or more playback devices in a zone or zone group may be configured to retrieve for playback audio content (e.g., according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

Figure 6:
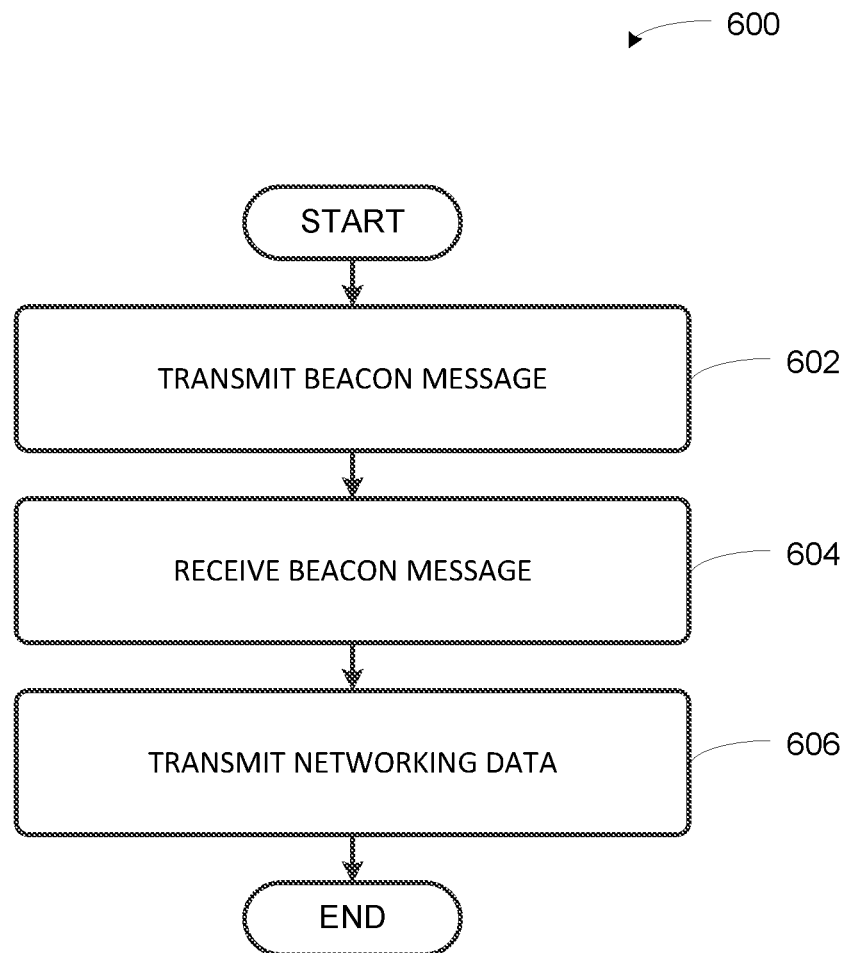
FIG. 6 shows an example flow diagram to facilitate detection of playback devices.
Figure 8:
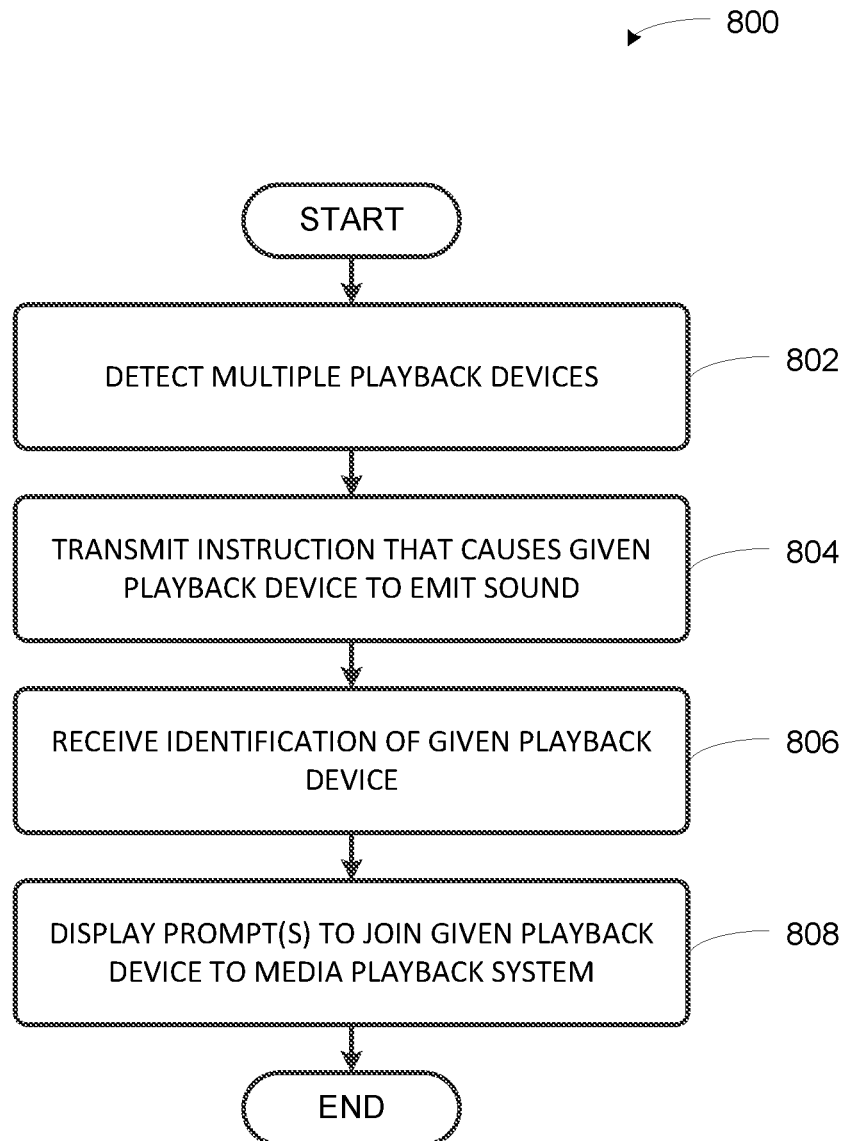
FIG. 8 shows an example flow diagram to facilitate identification of playback devices.
Figure 14:
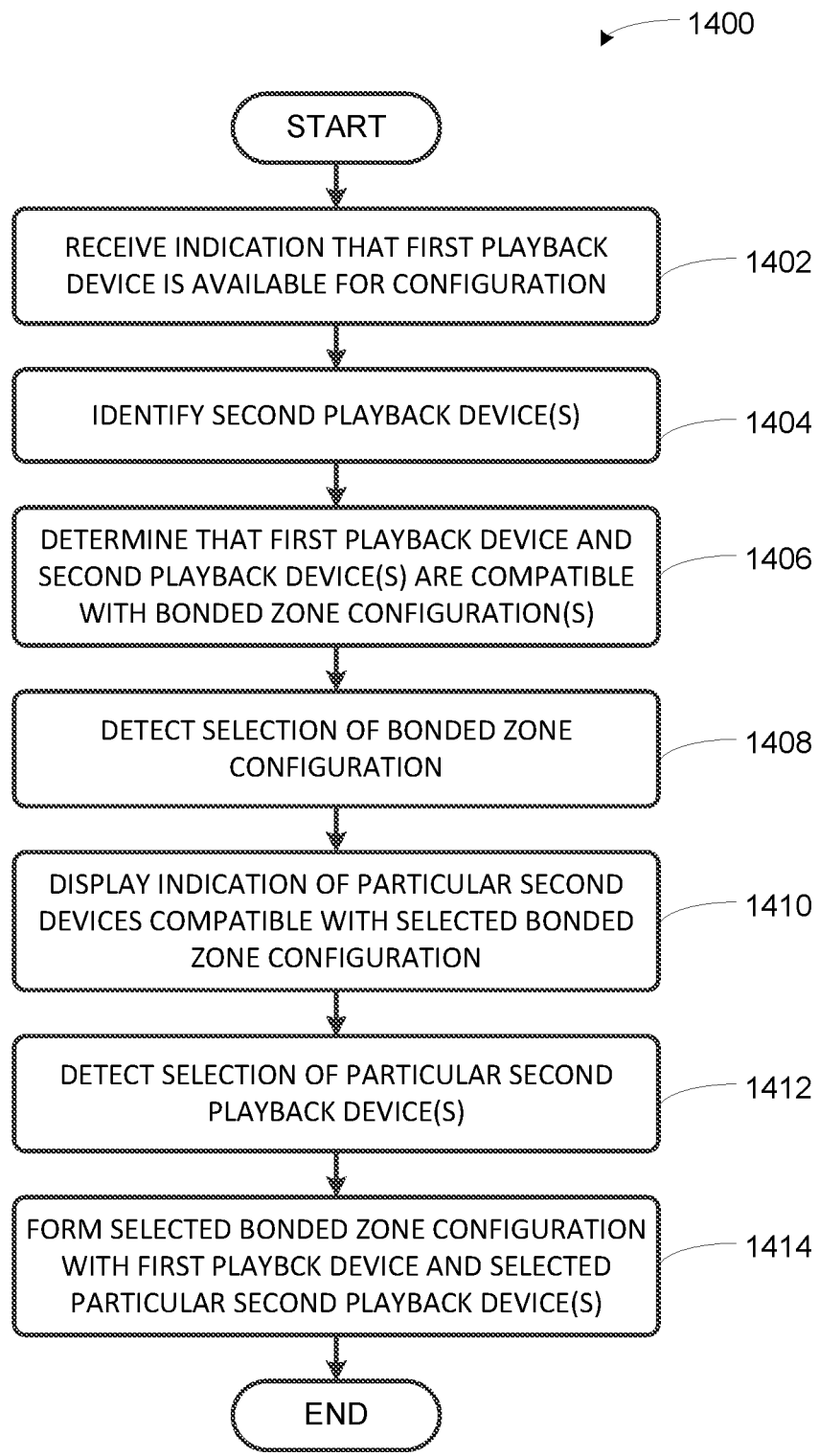
FIG. 14 shows an example flow diagram to facilitate identification and suggestion of playback devices.

Moving now to several example implementations, implementations 600, 800, and 1400 shown in FIGS. 6, 8 and 14, respectively present example embodiments of techniques described herein. These example embodiments that can be implemented within an operating environment including, for example, the media playback system 100 of FIG. 1, one or more of the playback device 200 of FIG. 2, or one or more of the control device 300 of FIG. 3. Further, operations illustrated by way of example as being performed by a media playback system can be performed by any suitable device, such as a playback device or a control device of a media playback system. Implementations 600, 800, and 1400 may include one or more operations, functions, or actions as illustrated by one or more of blocks shown in FIGS. 6, 8 and 14. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the implementations disclosed herein, the flowcharts show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache, and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the implementations disclosed herein, each block may represent circuitry that is wired to perform the specific logical functions in the process.

III. Example Detection of Playback Devices

As noted above, example playback devices described herein may support one or more protocols, such as APPLE® Wireless Accessory Configuration, which facilitate a playback device joining a network by which devices of a media playback system are interconnected. Such protocols may involve a message exchange by which a device of a media playback system (e.g., a control device, such as an APPLE® IPHONE®) detects a message (e.g., a beacon message) from a new or otherwise unconfigured playback device and provides networking information (e.g., a service set identifier and/or a security key of a network) to the playback device. Upon receiving such networking information, a playback device may use the networking information to connect to the media playback system via the network. Implementation 600 of FIG. 6 is an example implementation of such a protocol in a media playback system. Such an implementation may be carried out by one or more playback devices and/or one or more control devices, among other examples. In some cases, some operations are carried out by a playback device while others are carried out by a control device.

a. Transmit Beacon Message

At block 602, implementation 600 involves transmitting a beacon message. For instance, a new or otherwise unconfigured playback device may transmit a beacon message. Such a device may be, for example, playback device 200 or any given one of playback devices 102-124 of media playback system 100 shown in FIG. 1 before being configured into media playback system 100 or after being reset (e.g., factory reset). Example playback devices that are new, reset, or otherwise unconfigured as part of a media playback system may be generally referred to herein as new playback devices.

A beacon message may conform to a protocol, such as APPLE® Wireless Accessory Configuration and may be transmitted via a wireless protocol, such as IEEE 802.11™ By conforming to such a protocol, the message from a new playback device may be directed to pre-configured devices of the media playback system (e.g., one or more control devices and/or one or more pre-existing playback devices of the media playback system). The beacon message may act as a "beacon" in that such a message may notify a device receiving the message that the transmitting playback device exists and/or is within wireless range of that device. In some example protocols, a new playback device may repeatedly emit beacon messages until a response is received, which may increase the likelihood that a media playback system detects the new playback device.

The message may be sent over a network, such as an ad-hoc network or a personal area network, among other examples. Within examples, the particular network over which the beacon network is transmitted may be different from the network associated with the media playback system (i.e., the network that interconnects the devices of the media playback system). In some cases, a network may be temporarily formed to transmit the beacon. Such a network may be formed by certain components of the control device and/the playback device (e.g., an APPLE® WAC® chip).

b. Receive Beacon Message

At block 604, implementation 600 involves receiving the beacon message that was transmitted by the new playback device. For instance, control device 126 of FIG. 1 may receive a beacon message from playback device 112. As another example, smartphone 500 may receive a beacon message. As noted above, receiving such a beacon message may indicate to the receiving device that the transmitting device (e.g., a new playback device) is within wireless range of the receiving device and available to join a media playback system.

After receiving such a beacon message, the control device may display an indication that the new playback device was detected, perhaps within a control interface. Such control interface may facilitate configuring the new playback device.

Figure 7A:
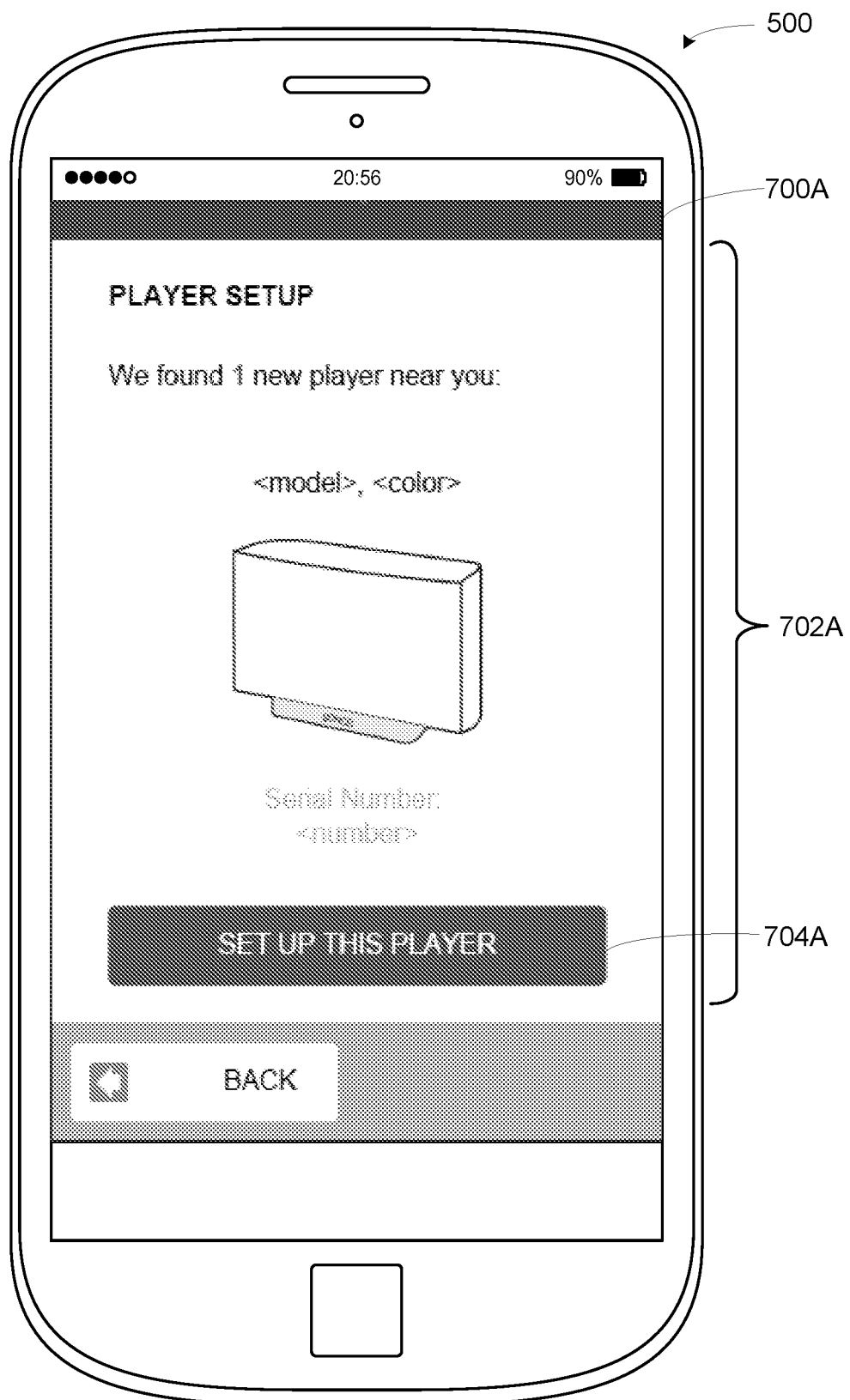
FIG. 7A shows a control device that is displaying an example control interface, according to an example implementation.

FIG. 7A depicts an example control interface 700A as displayed by smartphone 500. Control interface 700A includes a graphical region 702A indicating that a new playback device was detected. As noted above, such a playback device may be detected by way of a beacon message. Control interface 700A also includes a selectable control 704A, that when selected, initiates a procedure to setup the new playback device.

Figure 7B:
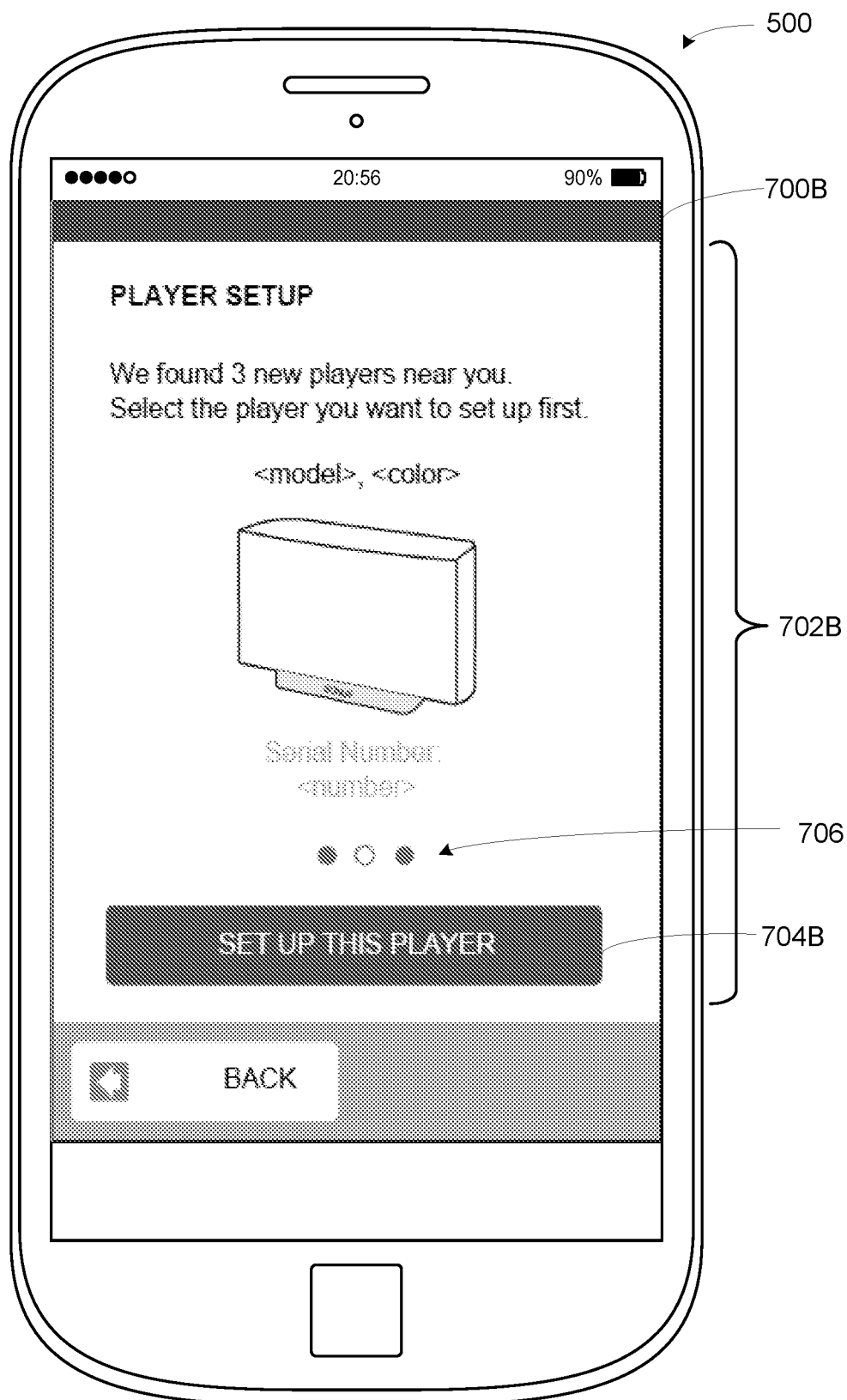
FIG. 7B shows a control device that is displaying an example control interface, according to the example implementation.

In some cases, respective beacon messages from may be received by a media playback system from multiple playback devices. Each beacon message may indicate that a respective new playback device is available to be configured. To illustrate, FIG. 7B depicts an example control interface 700B as displayed by smartphone 500. Control interface 700B includes a graphical region 702B indicating that multiple (3) new playback devices were detected. Control interface 700B also includes a selectable control 704B, that when selected, initiates a procedure to setup a given one of the new playback devices. Graphical region 706 may include three graphical elements, which indicate that three new playback devices were detected. Such a graphical region may suggest that a particular one of the new playback devices can be selected by using a swipe motion on control interface 700B.

c. Transmit Networking Data

Referring back to FIG. 6, at block 606, implementation 600 involves transmitting networking data. As noted above, devices of certain media playback systems described herein may be interconnected via a network. Such a network may have a certain identifier (e.g., a service set identifier (SSID))

and may perhaps be secured with a security protocol such that the access to devices having a particular security key of the network. After receiving a beacon message from a new playback device, a media playback system may transmit networking data indicating the certain identifier and/or key of the network to the new playback device. For instance, a control device of the media playback system may transmit networking data to the playback device. The control device may have access to the networking data by way of being connected to the indicated network. Alternatively, a previously configured playback device may transmit such networking data to a new or otherwise unconfigured playback device.

Using the networking data, the playback device may join the network, perhaps without any input. In some cases, such networking data may be transmitted to a particular new playback device after that playback device is selected for setup (e.g., by way of selectable controls 704A or 704B). Such input may also indicate a request or approval to send the networking data to the playback device.

In some examples, the media playback device may transmit additional data to the new playback device. Such data may include system configuration information and may cause the new playback device to adopt a certain configuration. For instance, the data may include an equalization. After receiving the equalization, the playback device may adjust its output according to the equalization. As another example, the data may include grouping information which causes the playback device to form a certain grouping, such as a bonded zone. Yet further, such data may include a name of the new playback device (e.g., a zone name, such as "Kitchen"). Other examples are possible as well.

IV. Example Techniques to Identify Playback Devices

As indicated above, in some cases, multiple similar playback devices may be detected at around the same time. For instance, two new playback devices of the same model may be introduced to the media playback system. FIG. 8 presents an implementation 800 that may facilitate distinguishing such devices from one another.

a. Detect Multiple Playback Devices

At block 802, implementation 800 involves detecting multiple playback devices. For instance, a device of a media playback system (such as a control device or a pre-existing playback device, e.g., smartphone 500) may detect two or more new (or otherwise unconfigured) playback devices of a given type (e.g., two or more playback devices of the same model and/or manufacture).

In some examples, the media playback system may detect the two or more playback devices by way of receiving respective beacon messages from the two or more playback devices. As described above in connection to implementation 600, new playback devices may emit beacon messages after being powered on. Receiving such a beacon message from a playback device which may notify a media playback system of the presence of that playback device.

To illustrate, referring to FIG. 1, in one example, playback devices 122 and 124 may be playback devices of the same model (e.g., SONOS® PLAY:5® devices) that are not configured into media playback system 100. After being powered on, playback devices 122 and 124 may begin transmitting respective beacon messages. Control device 126 (and/or control device 128 and/or a playback device of media playback system 100) may detect playback devices 122 and/or 124 by way of such beacon messages.

Within examples, the multiple detected playback devices may include all unconfigured devices within wireless range of the media playback system. By detecting all such devices, the media playback system may facilitate setup of the complete set of playback devices in a household (and possible groupings thereof). In other examples, the media playback system may detect a subset of the unconfigured devices, perhaps due to some interference in communications between certain new playback devices and the media playback system and/or by design.

Figure 9A:
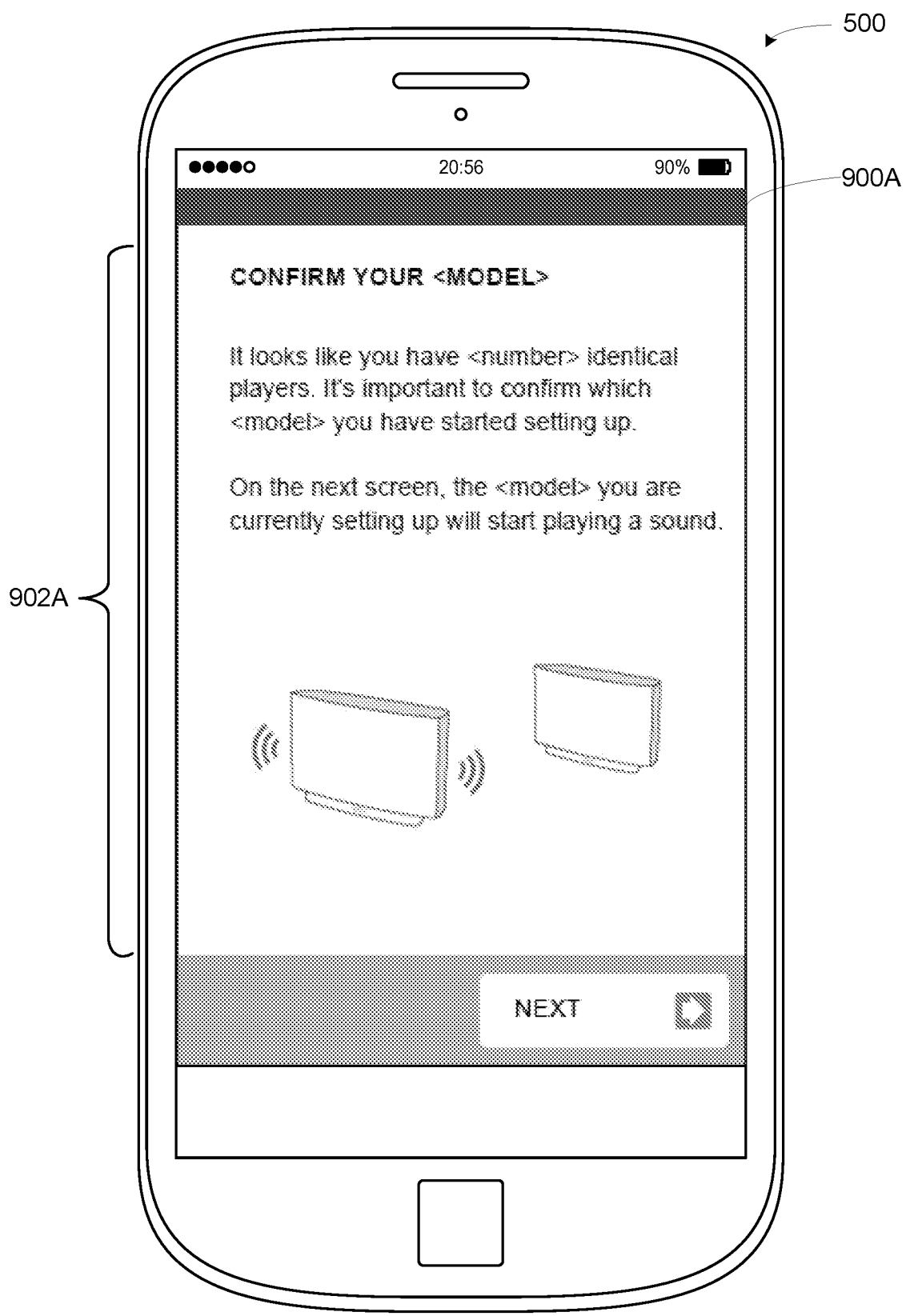
FIG. 9A shows a control device that is displaying an example control interface, according to an example implementation.

In some implementations, a media playback system may indicate that the multiple playback devices were detected via a user interface. For example, FIG. 9A depicts an example control interface 900A as displayed by smartphone 500. Control interface 900A includes a graphical region 902A indicating that multiple playback devices were detected and that one playback device will begin emitting a sound, which will facilitate identifying that playback device for setup.

Figure 9B:
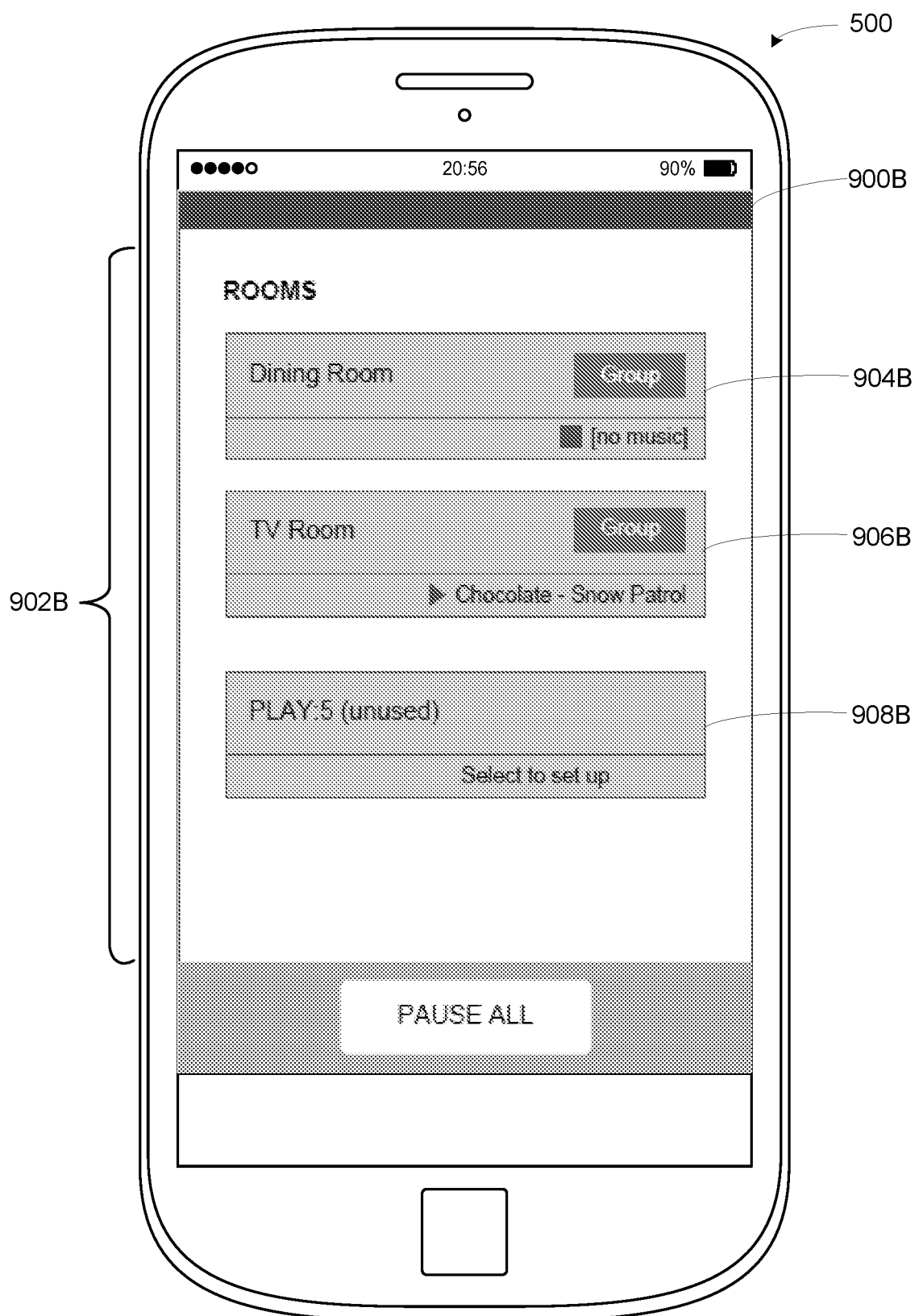
FIG. 9B shows a control device that is displaying an example control interface, according to the example implementation.

In other cases, a control device of the media playback system may display a control interface that indicates the multiple playback devices, perhaps by model, type, or serial number, among other examples. The control interface may indicate the detected (and unconfigured) playback devices along with pre-configured playback devices of the media playback system. To illustrate, FIG. 9B depicts an example control interface 900B as displayed by smartphone 500. Control interface 900B includes a graphical region 902B indicating both unconfigured playback devices and configured playback devices of a media playback system. Within graphical region 902B are graphical elements 904B, 906B, and 908B, which indicate respective devices or groups of devices. In particular, graphical element 904B indicates one or more playback devices of a "Dining Room" zone. Likewise, graphical element 906B indicates one or more playback devices of a "TV Room" zone. In some implementations, selection of either graphical element 904B or graphical element 906B may cause smartphone 500 to display a control interface associated with the respective zone. Such control interfaces may include various controls or displays associated with the respective zones, as illustrated by control interface 400 of FIG. 4.

Graphical element 908B indicates an unconfigured playback device (a SONOS® Play:5®). Selection of graphical element 908B may cause smartphone 500 to display one or more prompts (e.g., one or more control interfaces) to configure the playback device as part of the media playback system (e.g., as part of the zone). Where multiple new playback devices are detected, smartphone 500 may display respective indications of each device in graphical region 902B. After completing setup of a new playback device, that playback device may be displayed in graphical region 902B as a part of the media playback system (e.g., as a zone).

b. Transmit Instruction that Causes Given Playback Device to Emit Sound

Referring back to FIG. 8, at block 804, implementation 800 involves transmitting an instruction that causes a given playback device to emit sound. For instance, a control device, such as smartphone 500, may transmit, to a particular one of two or more detected playback devices, an instruction that causes the particular playback device to emit a given sound. As another example, control device 126 shown in FIG. 1 may transmit an instruction to playback device 106 (or playback device 108) that causes that playback device to emit sound.

Given that the particular device (e.g., playback device 122) is emitting the given sound while the other detected playback devices are not (e.g., playback device 124), output of such a sound may distinguish the particular playback device from the other detected playback devices. Similar playback devices (e.g., playback devices of a given model) may appear outwardly similar or even identical. As wireless communication may, in some cases, penetrate walls and other barriers, a media playback system may detect unconfigured playback devices that are in different physical households (e.g., in two neighboring apartments) so distinguishing such playback devices from the perspective of the existing devices may be helpful.

The given sound emitted by the playback device may take various forms. For instance, the given sound may be a tone or combination of tones (e.g., a melody). In other cases, the given sound may be a voice recording, perhaps with the recorded voice speaking a prompt to identify the playback device that is emitting the recording. In other cases, the sound may be an audio track. Such a track may be predetermined or might be determined from a music library of the media playback system (e.g., an audio track that was designated as a favorite in the media playback system). The playback device may emit sound for a given period of time (e.g., until a timeout is reached) and may repeat the sound under certain circumstances (e.g., if no identification is received).

The given sound may be stored on the playback device or on one or more devices that are communicatively coupled to the playback device. For instance, the playback device may include a data storage (e.g., memory 206 of playback device 200) and the sound may be stored in the data storage, perhaps as one or more audio files. Alternatively, the sound might stored on another pre-configured playback device of the media playback system or on a control device of the media playback system. In such cases, the playback device might receive the given sound from such devices via a network (e.g., a local area network). Yet further, the sound may be maintained on a server and transmitted to the playback device via a wide area network. Other examples are possible as well.

The media playback system may transmit additional instructions or information with the instruction to emit sound or in discrete messages. For instance, the smartphone 500 may send an instruction that causes a new playback device to set volume of the playback device at a certain level, which may increase the likelihood that the given sound emitted by the particular playback device is audible. As another example, the media playback system may instruct the particular playback device to illuminate one or more LEDs, perhaps in certain colors or patterns, so as to distinguish the particular playback device. Other instructions that cause the playback device to perform operations that distinguish the playback device are possible as well.

Within examples, a control device may transmit the instruction to emit sound via a first network (e.g., the network over which the beacon message was transmitted) or a second network (e.g., the network interconnecting the devices of the media playback system), among other examples. In some cases, the control device may transmit the instruction to emit sound via a first network with networking information. As noted above in connection to implementation 600, by sending certain networking information to a new playback device, the playback device may join the network associated with the media playback system.

c. Receive Identification of Given Playback Device

In FIG. 8, at block 806, implementation 800 involves receiving an identification of the given playback device. For instance, the media playback system may receive data indicating the particular playback device that emitted sound.

As noted above, emitting a sound may distinguish the given playback device from other playback devices, which may facilitate identifying that particular playback device. To illustrate, referring back to the example above, control device 126 shown in FIG. 1 may receive an identification of playback device 122 (given that playback device 122 was caused to emit sound).

In some implementations, receiving the identification of a particular playback device involves receiving a message from the particular playback device indicating that the particular playback device was identified. The particular playback device may send such a message after receiving particular input on the particular playback device (e.g., a particular button press or control selection). To prompt such an input, a control device of the media playback system may display one or more prompts to identify the particular playback device by providing the particular input on the playback device.

Figure 10A:
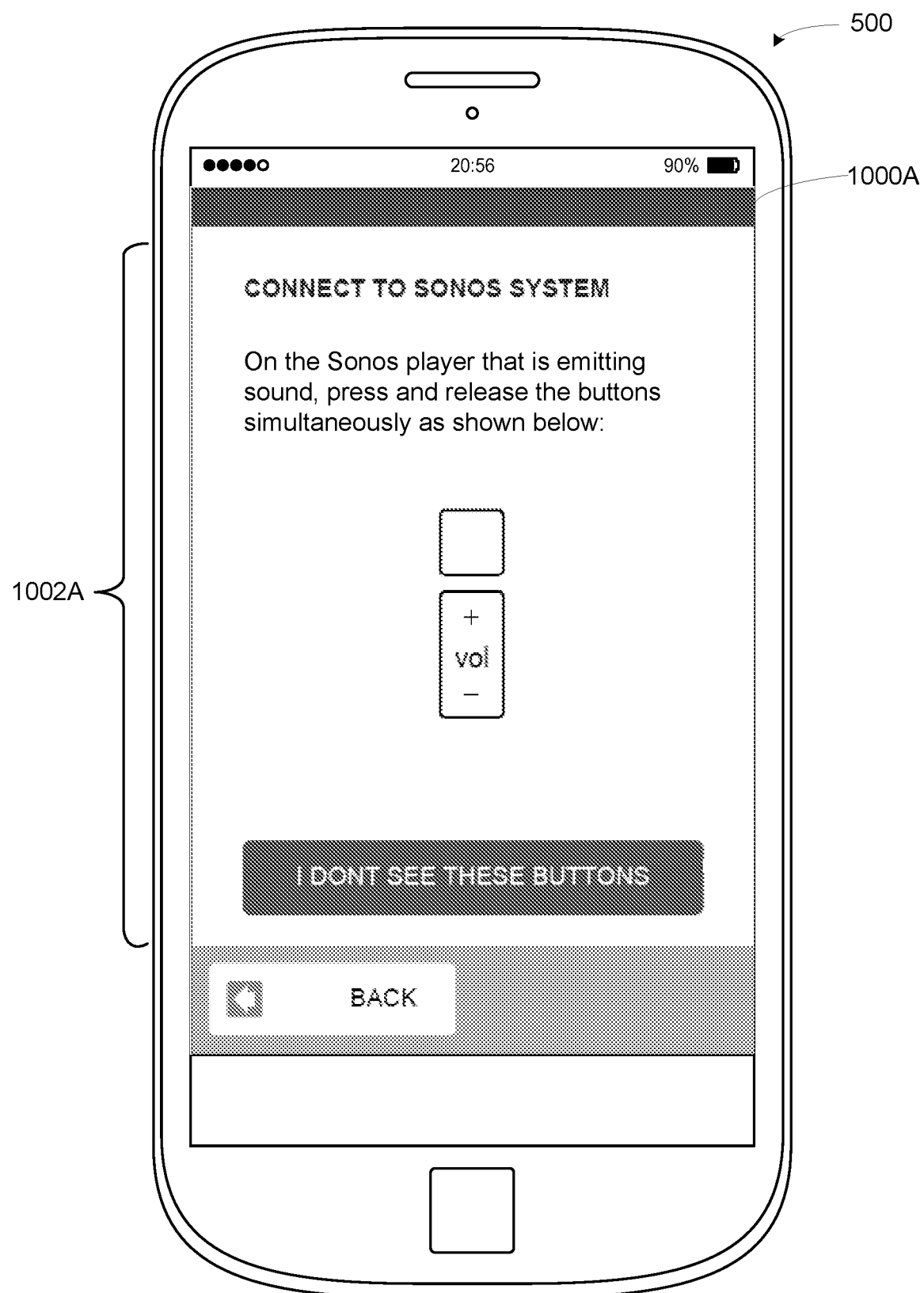
FIG. 10A shows a control device that is displaying an example control interface, according to an example implementation.
Figure 10B:
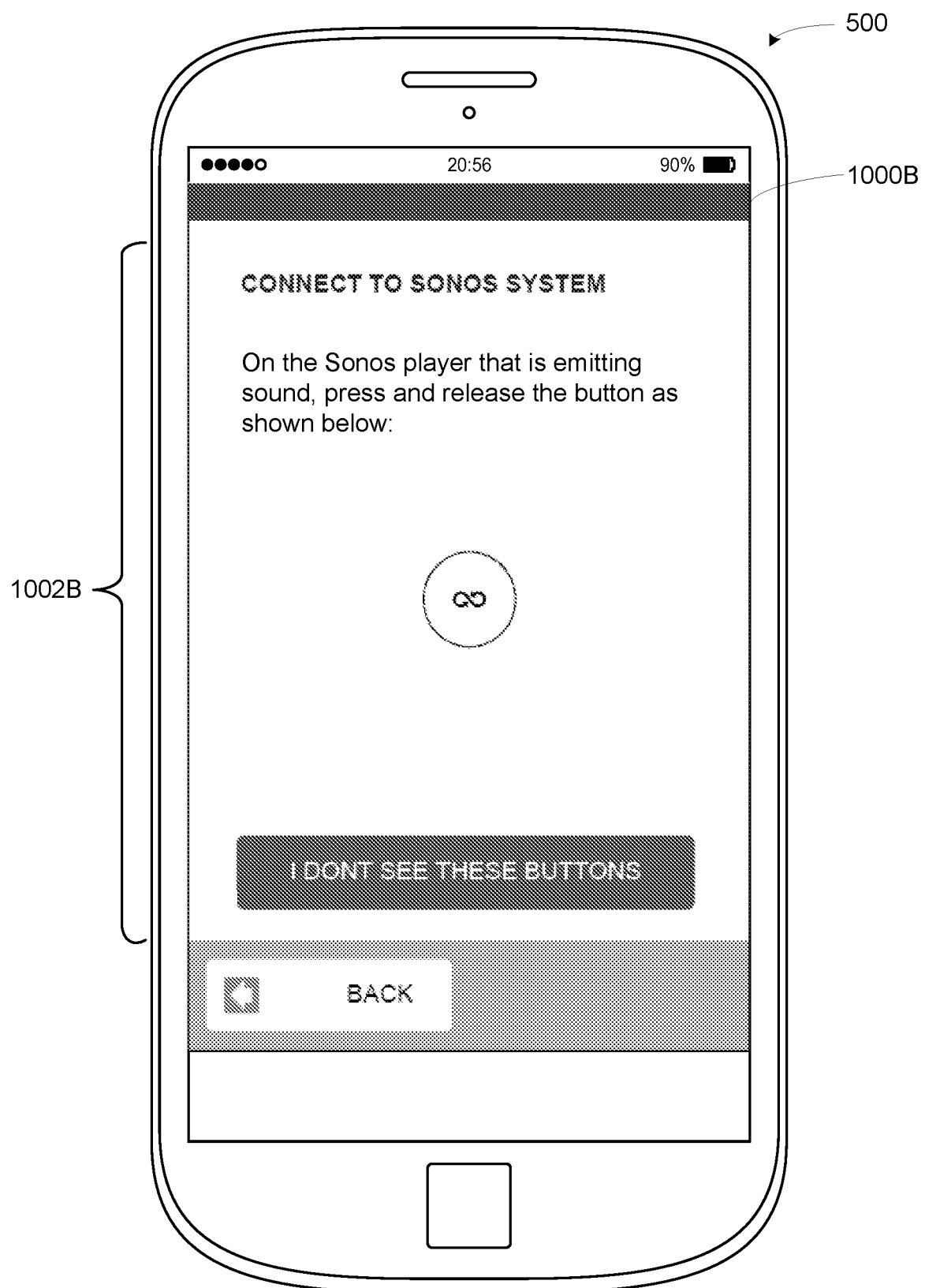
FIG. 10B shows a control device that is displaying an example control interface, according to an example implementation.

To illustrate, FIGS. 10A and 10B depict example prompts. In particular, FIG. 10A depicts an example control interface 1000A as displayed by smartphone 500. Control interface 1000A includes a graphical region 1002A. Graphical region 1002A prompts a user to press and release certain buttons on the playback device that is emitting sound. As another example, FIG. 10B depicts an example control interface 1000B as displayed by smartphone 500. Control interface 1000B includes a graphical region 1002B. Graphical region 1002B prompts a user to press and release a certain button on the playback device that is emitting sound. Other examples are possible as well.

Figure 11:
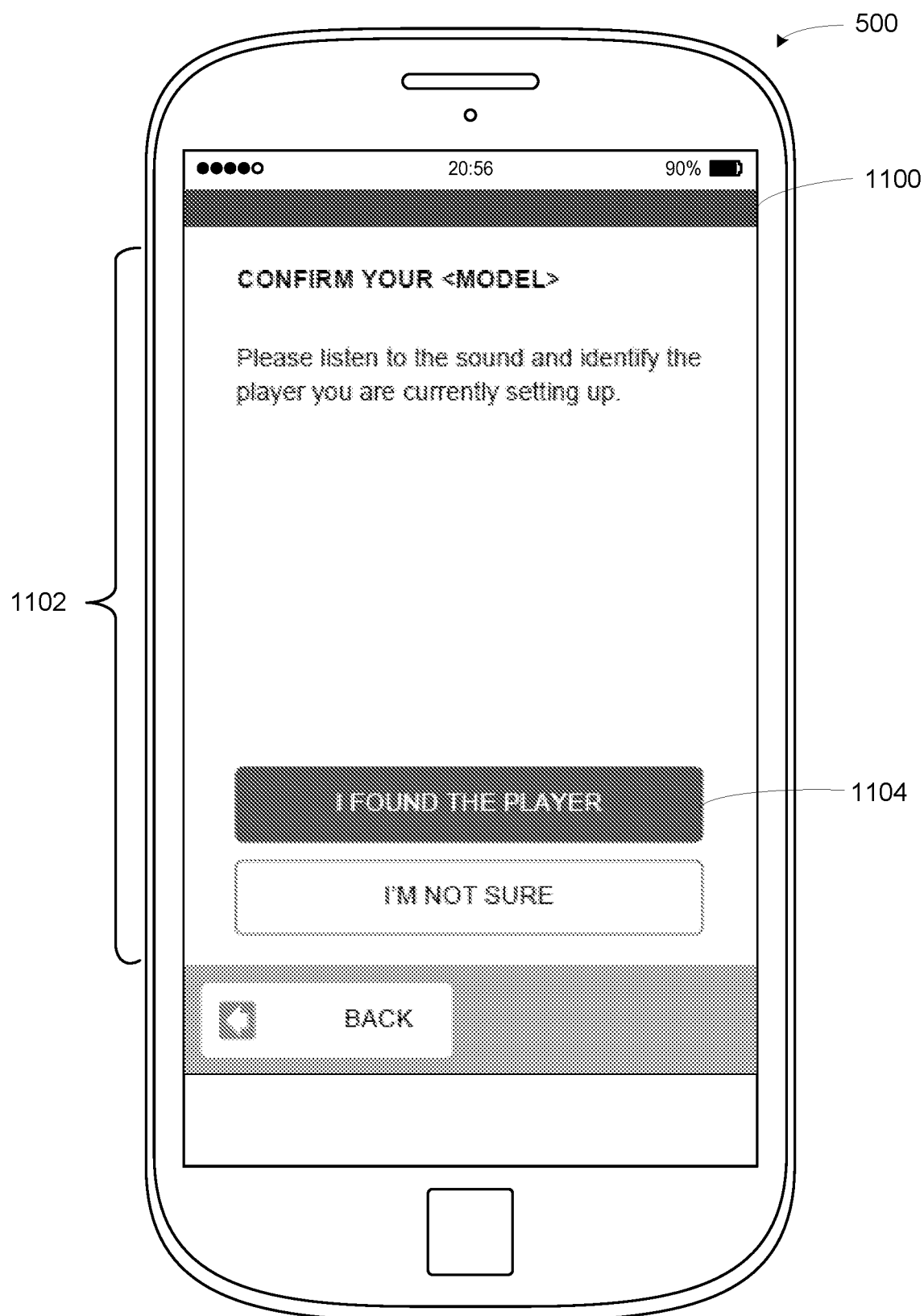
FIG. 11 shows a control device that is displaying an example control interface, according to an example implementation.

Before displaying the one or more prompts to identify the particular playback device, a control device of the media playback system may display a selectable control associated with the given sound. In particular, selection of such a control may indicate that that user has identified the particular playback device (that is emitting or has emitted sound). Selection of such a control may also indicate that setup should proceed. For example, FIG. 11 depicts an example control interface 1100 as displayed by smartphone 500. Control interface 1100 includes a graphical region 1102 that prompts a user to identify the particular playback device that is emitting sound. When selected, selectable control 1104 continues with setup of the particular playback device (e.g., by displaying a control interface such as control interface 1000A or 1000B, among other examples).

While as noted above, the media playback system may, in some cases, identify a particular playback device by way of a message from that particular playback device, the media playback system may alternatively identify the particular playback device by way of input on a device that is part of the media playback system. Such an alternate may be helpful in a variety of situations, such as when a user is unable to locate the new playback device based on the sound (e.g., if the player is unable to emit the sound) or when input is more convenient.

For example, a control device of the media playback system may indicate the serial numbers of the multiple detected playback devices. Such serial numbers may be printed on the playback devices or otherwise associated with respective devices. The playback devices may transmit these numbers to the control device in the respective beacon messages (or perhaps in separate messages).

Figure 12A:
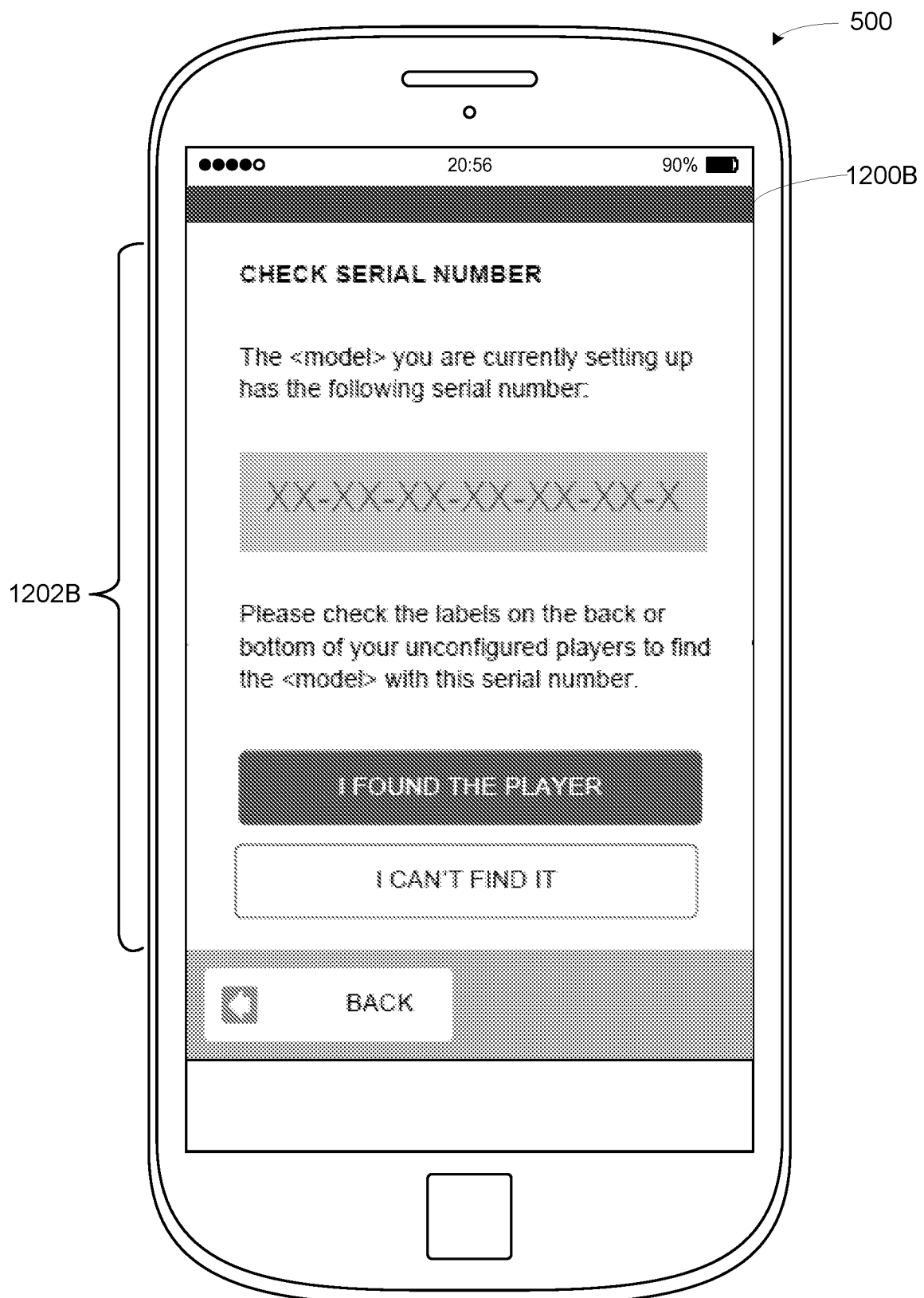
FIG. 12A shows a control device that is displaying an example control interface, according to an example implementation.

To illustrate, FIG. 12A depicts an example control interface 1200A as displayed by smartphone 500. Graphical region 1202B indicates the serial number of the particular playback device that emitted the sound. By comparing the serial number printed on one of the unconfigured playback devices to the displayed serial number, a particular one of the playback devices can be identified for setup.

Figure 12B:
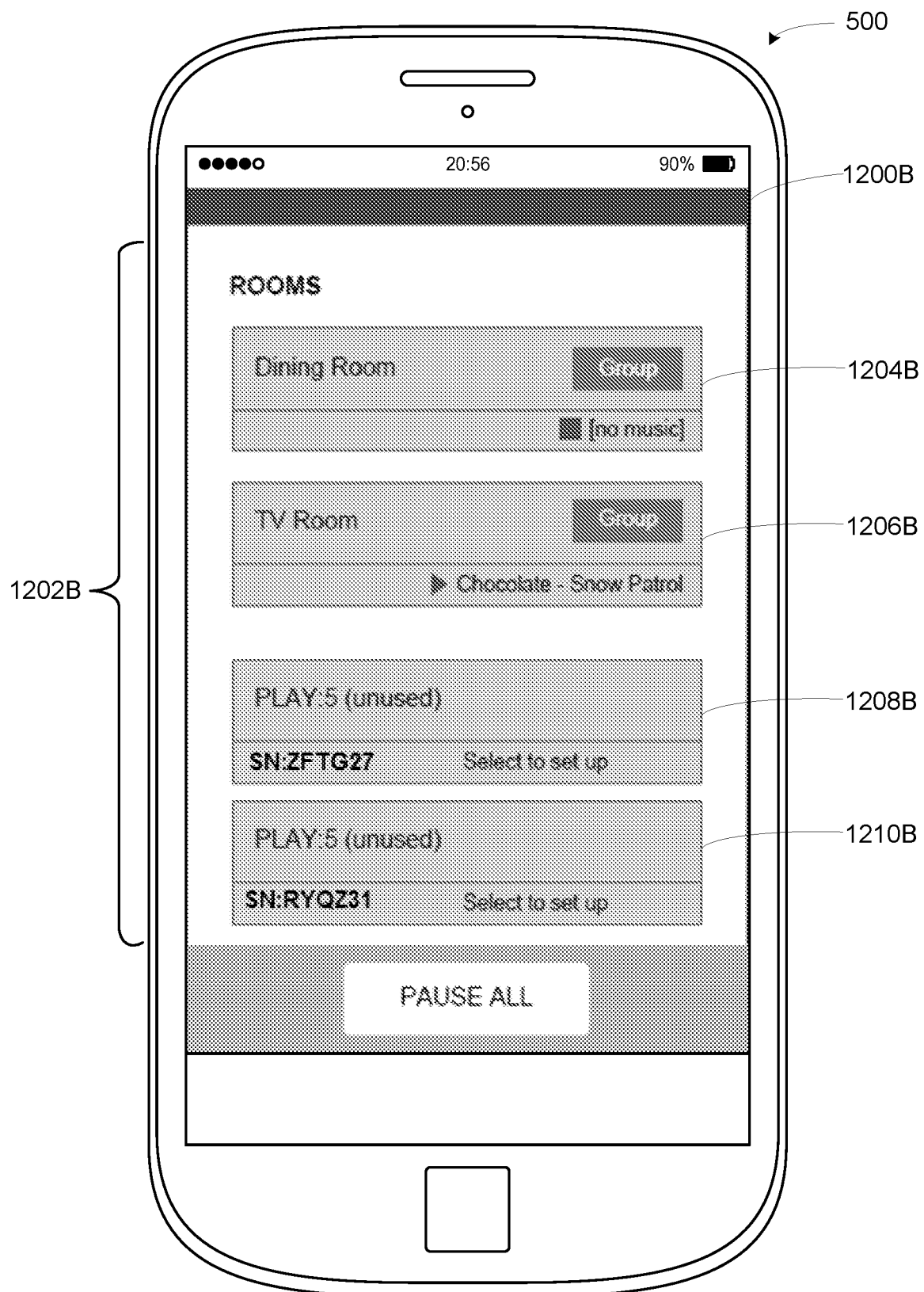
FIG. 12B shows a control device that is displaying an example control interface, according to an example implementation.

As another example, FIG. 12B depicts an example control interface 1200B as displayed by smartphone 500. Like graphical region 902B of control interface 900B, graphical region 1202B of control interface 1200B indicates both unconfigured playback devices and configured playback devices of a media playback system. Graphical element 1204B and graphical element 1206B indicate the "Dining Room" zone and "TV Room" zone, respectively. To facilitate identification of unconfigured playback devices, graphical elements 1208B and 1210B indicate respective unconfigured playback devices (i.e., two SONOS® Play:5® devices). Graphical elements 1208B and 1210B also indicate the respective serial numbers of the unconfigured playback devices. As with control interface 1200A, by comparing the serial number printed on one of the unconfigured playback devices to the displayed serial number, a particular one of the playback devices can be identified for setup.

Within examples, in some cases, a control device of a media playback system may display one or more prompts for entry of the serial number (or a portion thereof). In some embodiments, a control device may display such prompts instead of displaying the serial numbers of detected playback devices. Requesting input of a serial number may improve security, as physical possession of the playback device may be required to setup that playback device (e.g., where the serial number is printed on the playback device). Such embodiments may prevent setup of playback devices that are within wireless range of the media playback system but belong to other users (e.g., neighbors). Such input may facilitate identification when identification via the given sound is unsuccessful. However, identification via input might also be an additional option or alternative to identification via the given sound as well.

In some embodiments, after receiving the identification of the particular playback device, the media playback system may transmit networking information to the particular playback device. For instance, a control device of the media playback system may transmit an instruction that causes the particular playback device to connect with one or more pre-configured playback devices of the media playback system via the particular wireless network that interconnects the one or more pre-configured playback devices. For instance, playback devices 102-120 may be interconnected via a particular wireless network having a given identifier (e.g., a particular service set identifier) and perhaps also a certain key (e.g., a particular pre-shared key). After identifying playback device 122, control device 126 may send an instruction that causes playback device 122 to join the particular wireless network using the given identifier and/or the certain key.

d. Display Prompt(s) to Join Given Media Playback Device to Media Playback System Referring again to FIG. 8, at block 808, implementation 800 involves displaying one or more prompts to join the given playback device to the media playback system. For instance, a control device may display one or more control interfaces that include one or more prompts to configure the identified playback device as part of the media playback system.

Such prompts may include prompts to configure the playback device as a particular zone. For instance, control device 126 may display one or more prompts to configure playback device 122 into a zone of media playback system 100. By way of such prompts, playback device 122 may be configured into the "Master Bedroom" zone (or perhaps another zone).

Figure 13:
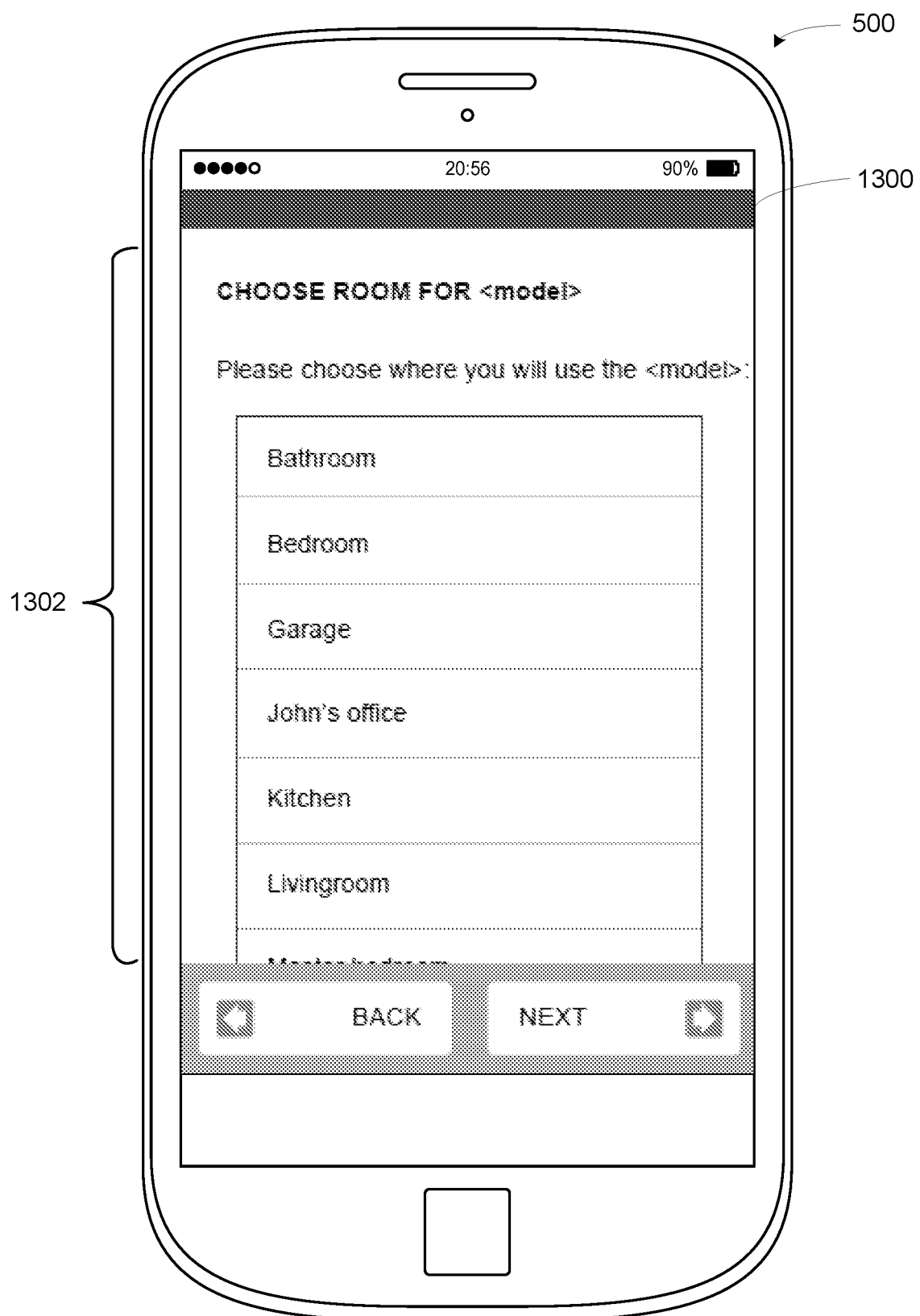
FIG. 13 shows a control device that is displaying an example control interface, according to an example implementation.

To illustrate, FIG. 13 depicts an example control interface 1300 as displayed by smartphone 500. Control interface 1300 includes a graphical region 1302 that includes a plurality of selectable controls corresponding to zones of a media playback system (e.g., a "Bathroom" zone, a "Bedroom" zone, a "Garage" zone, and so on). Selection of a given one of these controls causes the new playback device to be joined into that zone.

In some cases, the one or more prompts may include a prompt to configure the playback device into a bonded zone (e.g., a stereo pair or surround sound configuration). Yet further, in some cases, such prompts may suggest compatible configurations, such as compatible bonded zones or other groupings as described below. Other examples are possible as well.

V. Example Techniques to Identify and Suggest Playback Device Groupings

As discussed above, embodiments described herein may involve identifying and/or suggesting certain groupings of playback devices. FIG. 14 illustrates an example implementation 1400 to facilitate identifying and/or suggesting certain groupings of playback devices a. Receive an Indication that a First Playback Device is Available for Configuration At block 1402, implementation 1400 involves receiving an indication that a first playback device is available for configuration. For instance, a media playback system (e.g., control device 126 of media playback system 100) may receive one or more messages indicating that a first playback device is available for configuration into a zone of a media playback system.

To illustrate, referring to FIG. 1, consider a first example and a second example. In the first example, playback device 124 is a new playback device that is not configured into media playback system 100 (but perhaps playback devices 102-122 have been previously configured into media playback system 100). In practice, control device 126 and/or control device 128 may receive one or more messages indicating that playback device 124 is available for configuration into a media playback system (e.g., media playback system 100). In a second example, playback devices 106 and 108 are new playback devices that are not configured into media playback system 100 (but the other playback devices shown have been previously configured into media playback system 100). In practice, control device 126 and/or control device 128 may receive one or more messages indicating that playback devices 106 and/or 108 are available for configuration into the media playback system.

Within examples, such messages may be any one or more messages indicating that a first playback device is available for configuration into a media playback system (e.g., by being within wireless range of the media playback system). For instance, the one or more messages may include a beacon message, such as the example beacon messages described in connection with implementation 600. As noted above, a beacon message may act as a "beacon" in that such a message may notify a device receiving the message that the transmitting playback device exists and/or is within wireless range of that device such that the device is available for configuration.

Such messages may be received via a network (e.g., a wireless local area network or a personal area network, among other examples). In some cases, the media playback system may include one or more previously configured playback devices that are interconnected to a control device and/or one another via a particular network. In some implementations, the control device may receive the one or more messages indicating that the first playback device is available for configuration via such a network. Alternatively, a discrete network between the first playback device and the media playback system may be formed for the purpose of transmitting the one or more messages indicating that a first playback device is available for configuration into a zone of a media playback system.

As noted above, in some examples, the one or more messages may be received via a wireless area network (e.g., the wireless LAN interconnecting the media playback system). One example of such messages is the SONOS® Netstart protocol. Per that protocol, a new playback device (e.g., the first playback device) transmits a message indicating that the new playback device is present and available. Such a message may be referred to as an "Alive" message. After receiving the Alive message, a control device of a media playback system may receive or transmit one or more messages to facilitate the new playback device joining the media playback system.

While certain types of messages and protocols have been described by way of example, other types of messages and/or protocols may be implemented as well.

b. Identify Second Playback Device(s)

At block 1404, implementation 1400 involves identifying one or more second playback devices. Such second playback devices may include playback devices that have been previously configured into the media playback system and/or additional playback devices that are available for configuration into the media playback system. In some implementations, the second playback devices may include the playback devices that are connected to a particular network (e.g., a network by which playback devices of a media playback system are interconnected). Such devices may include both configured and unconfigured playback devices.

As noted above, the one or more second playback devices may include playback devices that have been previously configured into the media playback system. Example media playback systems may maintain or have access to data (e.g., a database) indicating the devices of the media playback system. Such data may include the names of the devices, addresses of the devices, and/or the configuration of the devices. Such data may be represented as one or more state variables. Such state variables may be maintained in data storage of one or more playback devices of the system and/or one or more cloud servers and may be accessible over one or more networks to playback devices and/or control devices of the media playback system. In some cases, the media playback system may identify one or more of the second playback devices via such data. For instance, referring back to the first example above, the media playback system may identify playback devices 102-122 as second devices.

As also noted above, the one or more second playback devices may include additional playback devices that are available for configuration into the media playback system (i.e., new or otherwise unconfigured playback devices). The media playback system may identify such playback devices using a variety of techniques, such as the example techniques described in connection with implementations 600 and/or 800, among other examples. For instance, referring back to the second example above, given that the first playback device is playback device 106, the media playback system may identify playback device 108 as a second device (i.e., a playback device that is available for configuration). In the second example, the media playback system may also identify playback devices 102, 104, and 110-124 as second devices (i.e., playback devices that have been previously configured into media playback system 100).

c. Determine that the First Playback Device and the Second Playback Device(s) are Compatible with One or More Bonded Zone Configurations At block 1406, implementation 1400 involves determining that the first playback device and the second playback devices are compatible with one or more bonded zone configurations. The compatible configurations may depend on the number and type of second playback devices relative to the first playback device. For instance, second playback devices of the same type (e.g., of the same model) as the first playback device may be compatible with forming certain groupings with the first playback device. In other examples, certain bonded zone configurations may involve a certain combination of playback devices of different types. For example, a surround sound configuration may involve a combination of playback devices that are compatible with forming respective surround sound channels (e.g., left, right, center, rear, etc). As yet another example, a full-range playback device may be combined with a subwoofer into a bonded zone.

Referring again to the first example in which playback device 124 is the first device and previously configured playback devices 102-122 are second devices, the first example may continue with the media playback system determining that playback device 124 is compatible with forming one or more bonded zone configurations with the other playback devices shown in FIG. 1. For instance, the media playback system may determine that playback device 124 is compatible with one or more stereo pair configurations. Such stereo pair configurations might include forming a stereo pair with one of playback device 112, 114, or 122. Determining that playback device 124 and one of playback device 112, 114, or 122 are compatible to form a stereo pair might involve determining that playback device 112, 114, and 122 are of the same type as playback device 124. Such a determination may also involve determining that playback device 112, 114, and 122 are operating independently (e.g., not already in a bonded zone configuration).

Referring now to the second example in which playback device 106 is the first device and the other playback devices shown in FIG. 1 are second playback devices, the second example may continue with the media playback system determining that playback device 106 is compatible with forming one or more bonded zone configurations with the other playback devices shown in FIG. 1. For instance, the media playback system may determine that playback device 106 is compatible with one or more stereo pair configurations and one or more surround sound configurations. Such stereo pair configurations might include forming a stereo pair with one of playback device 102, 108, 116, 118, or 120. The surround sound configurations might include forming a surround sound configuration with playback device 104 and 108 (and possibly also playback device 110, as an optional subwoofer channel of the configuration).

Determining that these playback devices are compatible with forming the surround sound configuration might involve determining that a combination of playback device 106 with playback device 104 and 108 include the particular set of components that forms a surround sound configuration. Certain sets of components may form different surround sound configurations. For instance, certain combinations of playback devices may form 3.1, 5.0, 5.1, 7.1, or other multiple-channel surround sound configurations.

In the second example, playback device 104 is a playbar type of device that can output three channels of audio (e.g., left, right, and center channels of a surround sound configuration). Playback devices 106 and 108 can operate as surround channels of that surround sound configuration. Together, they provide five surround sound channels (i.e., a 5.0 configuration). In combination with playback device 110, the surround sound configuration is a 5.1 channel configuration. While in this example, a single playbar type device is shown as providing three channels of the surround sound configuration, in other examples, respective devices may each provide surround channel. For instance, separate playback devices may provide left, right, center, and surround channels of a surround sound configuration.

d. Detect Selection of Bonded Zone Configuration

At block 1408, implementation 1400 involves detecting selection of a bonded zone configuration. For instance, a control device of the media playback system may display a control interface indicating available configurations. Such configurations may include the one or more compatible bonded zone configurations identified in connection with block 1406. For instance the control device may detect selection of a stereo pair configuration or a bonded zone configuration, among other examples. Such configurations may also include independent operation (e.g., operation of the playback device outside of a bonded zone configuration). By indicating the compatible bonded zone configurations on the display, the media playback system may in effect be suggesting those playback devices.

Figure 15:
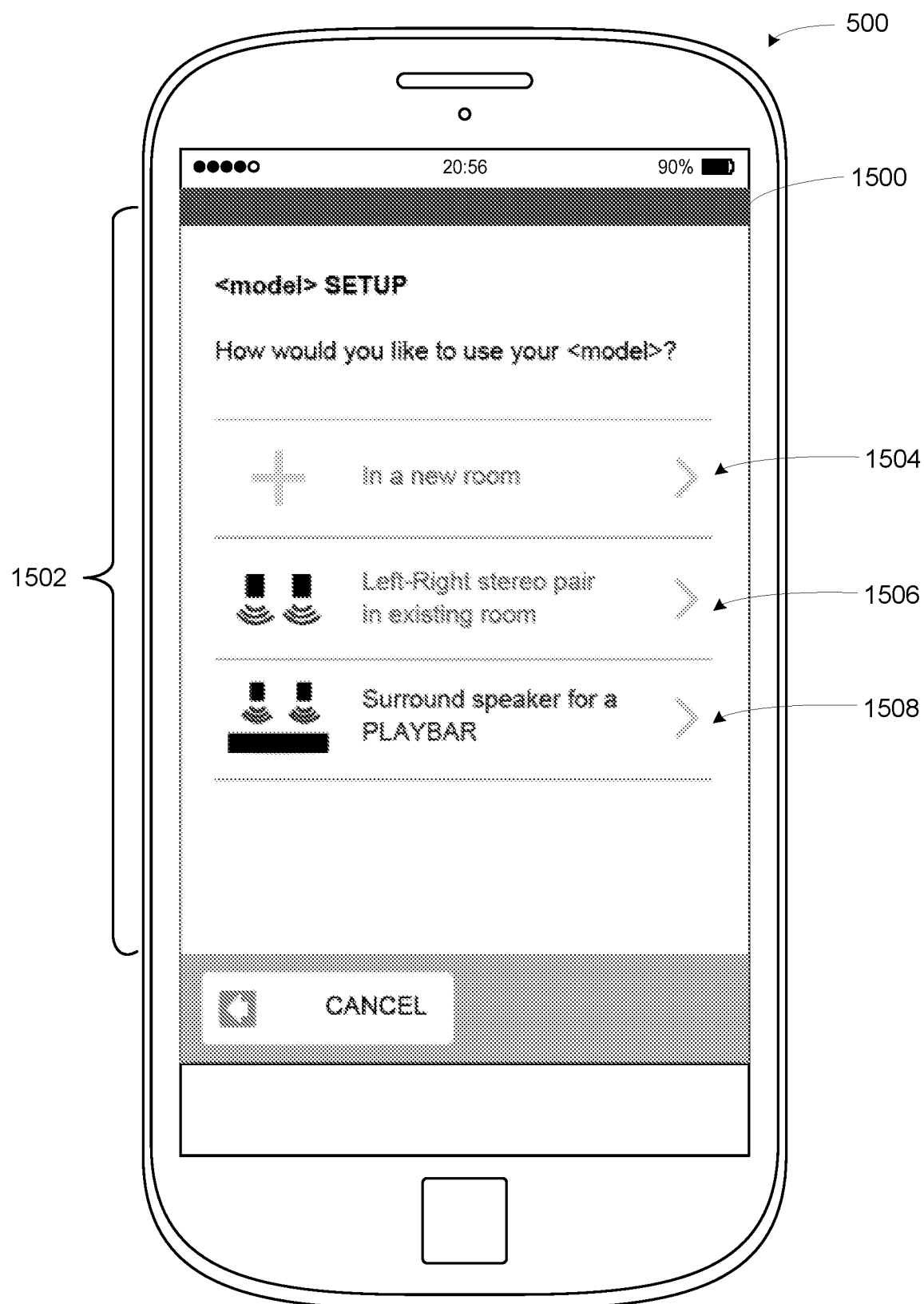
FIG. 15 shows a control device that is displaying an example control interface, according to an example implementation.

To illustrate, FIG. 15 depicts an example control interface 1500 as displayed by smartphone 500. Control interface 1500 includes a graphical region 1502 indicating available configurations for an example playback device being configured into a media playback system. Within graphical region 1502 of control interface 1500 are graphical elements 1504, 1506, and 1508, which indicate respective configurations for that playback device. In particular, graphical element 1504 indicates independent operation. Selection of graphical element 1504 causes the media playback system to setup the example playback device independently as a zone of a media playback system. Graphical elements 1506 and 1508 indicate a stereo pair and surround sound configurations respectively. Selection of graphical element 1506 leads to configuration of the example playback device as a stereo pair, while selection of graphical element 1508 begins configuration of the example playback device as one or more channels of a surround sound configuration. As noted above, other types of configurations are possible as well.

Referring back to the first and second examples above, in these examples, control device 126 and/or 128 may detect selection of a bonded zone configuration. For instance, in the first example, control device 126 might detect selection of a stereo pair configuration. To prompt such selection, control device 126 may display independent and stereo pair as available configurations (given that a surround sound configuration is not compatible in this particular example and that both stereo pair and independent operation are compatible). By doing so, control device 126 may suggest a stereo pair (or independent operation).

In the second example, control device 126 might detect selection of a surround sound configuration, perhaps after prompting such selection by way of displaying independent operation, stereo pair, and surround sound as available configurations. Here, by suggesting the surround sound configuration, the media playback system may facilitate setup of not only playback device 106 but also the other unconfigured playback device that is compatible with the surround sound configuration (i.e., playback device 108). Other examples are possible as well.

Some types of playback devices might not be compatible with certain types of operation or might only be compatible with certain types of operation. In such cases, the control device might not display compatible configurations for selection. Instead, the control device may instead automatically proceed to a next step in setup. For instance, a subwoofer-type playback device might only be compatible with operation in a bonded zone configuration in which the subwoofer plays bass frequencies below a given crossover frequency and the other playback devices in the bonded zone are configured to output frequencies above the crossover. As such, the control device may display a list of compatible playback devices to form that type of bonded zone configuration.

e. Display Indication of Particular Second Playback Devices Compatible with Selected Bonded Zone Configuration Referring again to FIG. 14, at block 1410, implementation 1400 involves displaying an indication of one or more particular second playback devices that are compatible with the selected bonded zone configuration. Within examples, these particular second playback devices may include playback devices that have been previously configured into the media playback system as well as new, unconfigured playback devices, or both, depending on the selected configuration and the compatibility of the second playback devices with the first playback device.

As noted above, in some cases, the particular second playback devices may include playback devices that have been previously configured into the media playback system. As such, these playback devices may have been previously configured into respective zones of the media playback system. In such cases, displaying the indication of the one or more particular second playback devices that are compatible may involve displaying the respective zones of the media playback system that correspond to the particular second playback devices. Zones of a media playback system may be indicated by their names (e.g., "Kitchen," "Living Room," or "Den," which may facilitate identification of the desired second devices with which to combine the first playback device.

Figure 16:
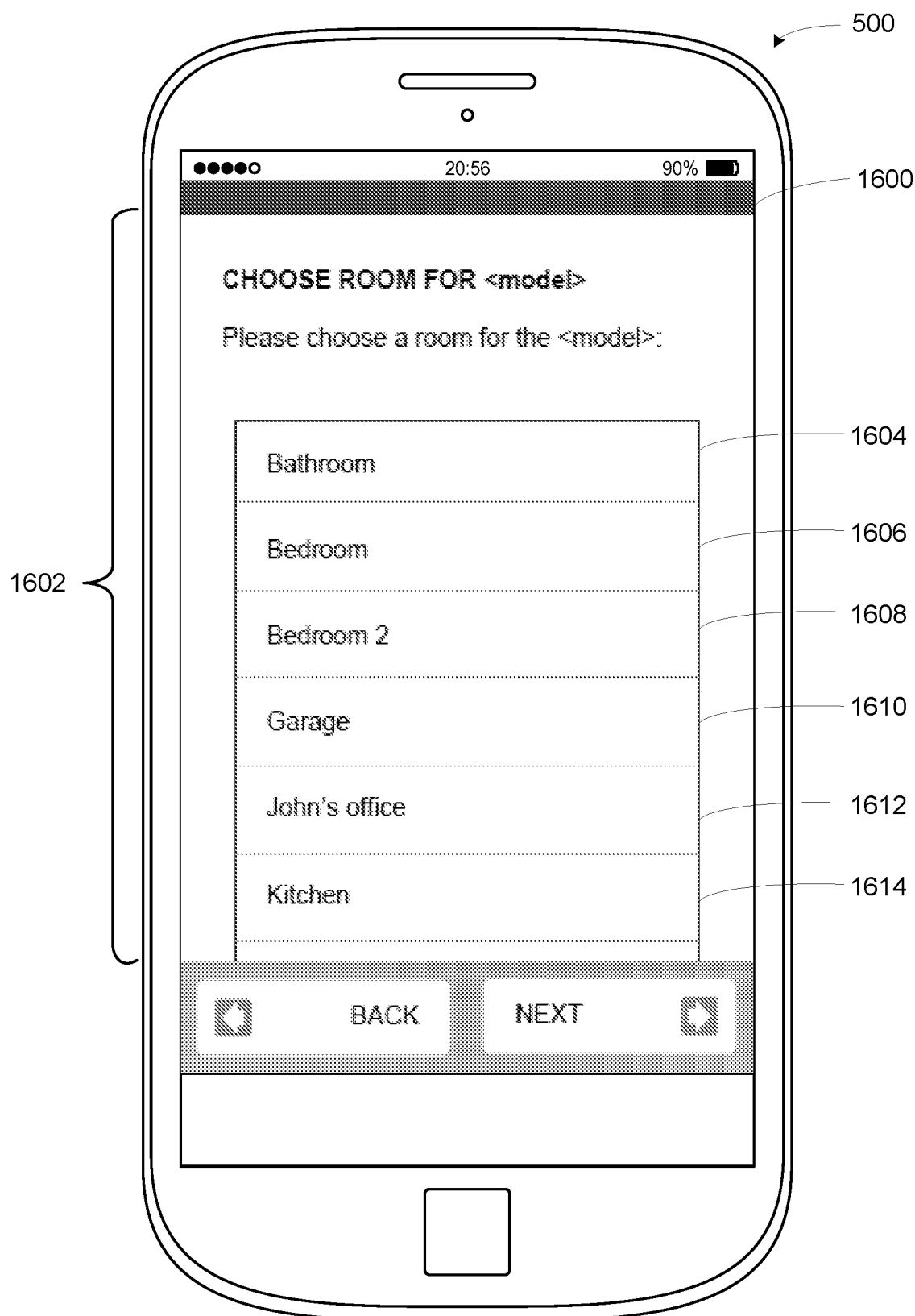
FIG. 16 shows a control device that is displaying an example control interface, according to an example implementation.

To illustrate, FIG. 16 depicts an example control interface 1600 as displayed by smartphone 500. Control interface 1600 includes a graphical region 1602 indicating zones of a media playback system. Each indicated zone corresponds to one or more particular playback devices that are compatible with a selected bonded zone configuration. In particular, graphical region includes graphical elements 1604, 1606, 1608, 1610, 1612, and 1614 (and possibly others that are viewable by way of scrolling). Selection of a particular one of these graphical elements continues setup of the selected bonded zone configuration with the playback devices of the selected zone. When indicating playback devices and/or zones, the media playback system may exclude those playback devices or zones that are not compatible with the selected bonded zone configuration.

Following again the first example above where a stereo pair was selected, the particular playback devices that are compatible with the surround sound configuration are playback devices 112, 114, and 124. In such an example, control device 126 may display an indication of playback devices 112, 114, and 124 and/or an indication of the Dining Room, Kitchen, and Master Bedroom zones of media playback system 100, among other examples. Selection of a given one of these playback devices or zones may cause the media playback system to continue setup of playback device 124 into the stereo pair with the selected playback device.

In the second example where a surround sound configuration was selected, the particular playback devices that are compatible with the surround sound configuration are playback device 104, playback device 108, and playback device 110. In this example, control device 126 may display an indication of playback devices 104, 108, and 110 and/or an indication of the Living Room zone of media playback system 100, among other examples. Selection of a these devices or zone may cause the media playback system to continue setup of playback device 124 into the surround sound configuration.

f. Detect Selection of Particular Second Playback Device(s)

In FIG. 14, at block 1412, implementation 1400 involves detecting selection of at least one particular second playback device from among the one or more particular second playback devices that are compatible with the selected bonded zone configuration. For instance, the media playback system may detect that a certain set of one or more particular second playback devices were selected from among those particular second playback devices that are compatible with the selected bonded zone configuration. As noted above, in some implementations, a control device may display a control interface that indicates the one or more particular second playback devices that are compatible with the selected bonded zone configuration and the control device may detect selection of a certain set of those playback devices via input on the control interface.

As noted above, in some cases, example control interfaces may indicate the one or more particular second playback devices that are compatible with the selected bonded zone configuration by way of indicating their respective zones. As such, detecting selection of the particular second playback device(s) may involve detecting selection of a particular zone. Zones may include one playback device operating independently (as a zone, but possibly jointly with a zone group) or multiple playback devices in a grouped configuration. Accordingly, by detecting selection of a zone, in some cases the media playback system may detect selection of multiple playback devices.

To illustrate, referring back to FIG. 16, in some examples, detecting selection of a particular zone may involve detecting selection of a zone via a control interface, such as control interface 1600. In particular, detecting selection of a zone may involve detecting one of graphical elements 1604-1614. For example, smartphone 500 may detect selection of graphical control 1614, which selects the one or more playback devices of the "Kitchen" zone.

Figure 17A:
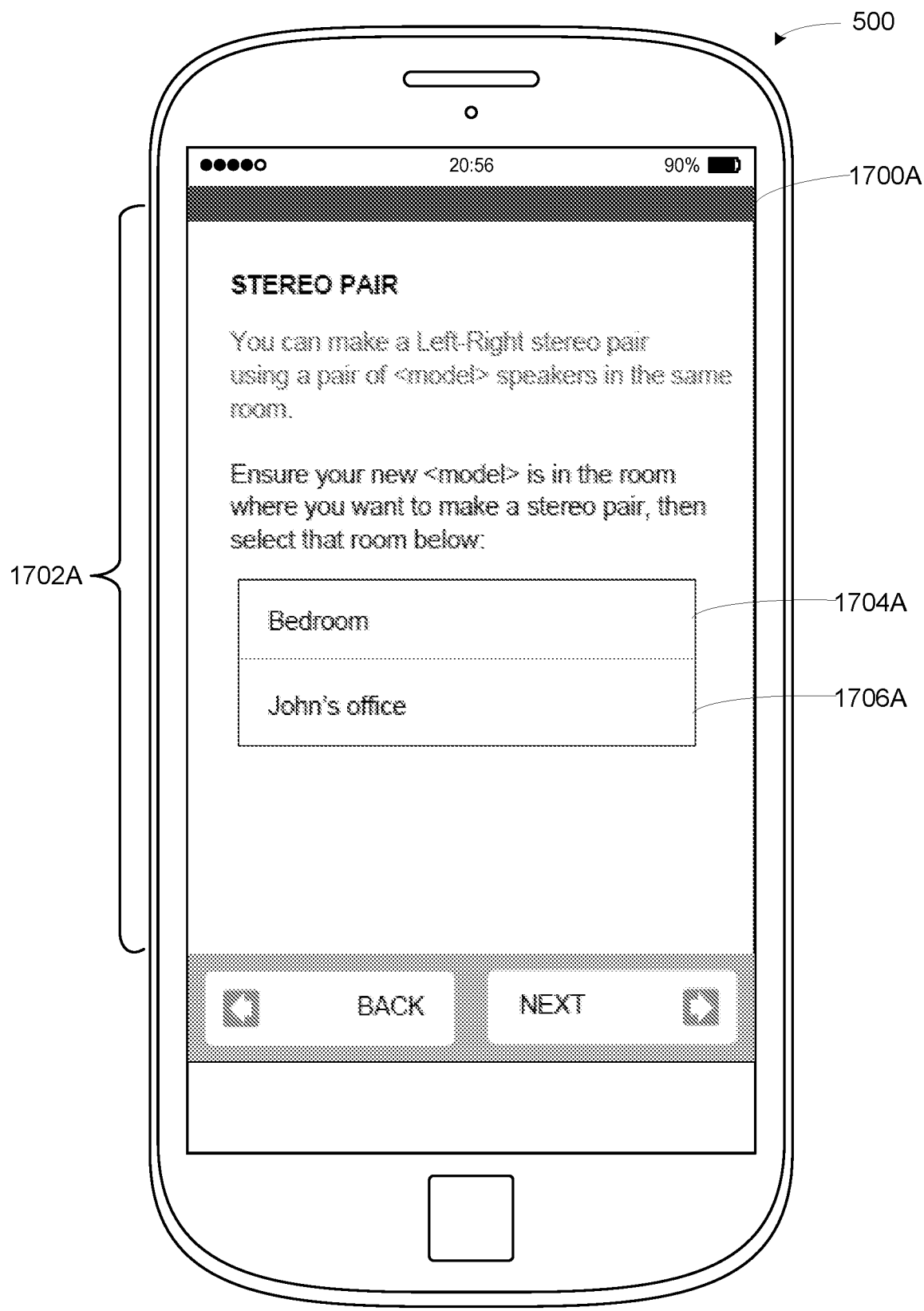
FIG. 17A shows a control device that is displaying an example control interface, according to an example implementation.

In some examples, detecting selection of a particular zone may involve detecting selection of a particular second device with which the first playback device will form a stereo pair. To illustrate, FIG. 17A depicts an example control interface 1700A as displayed by smartphone 500. Control interface 1700A includes a graphical region 1702A indicating zones of a media playback system. Each indicated zone corresponds to one or more particular playback devices that are compatible with a stereo pair configuration. In particular, graphical region includes graphical elements 1704A and 1706A. Selection of a particular one of these graphical elements continues setup of the stereo pair with the playback devices of the selected zone.

Figure 17B:
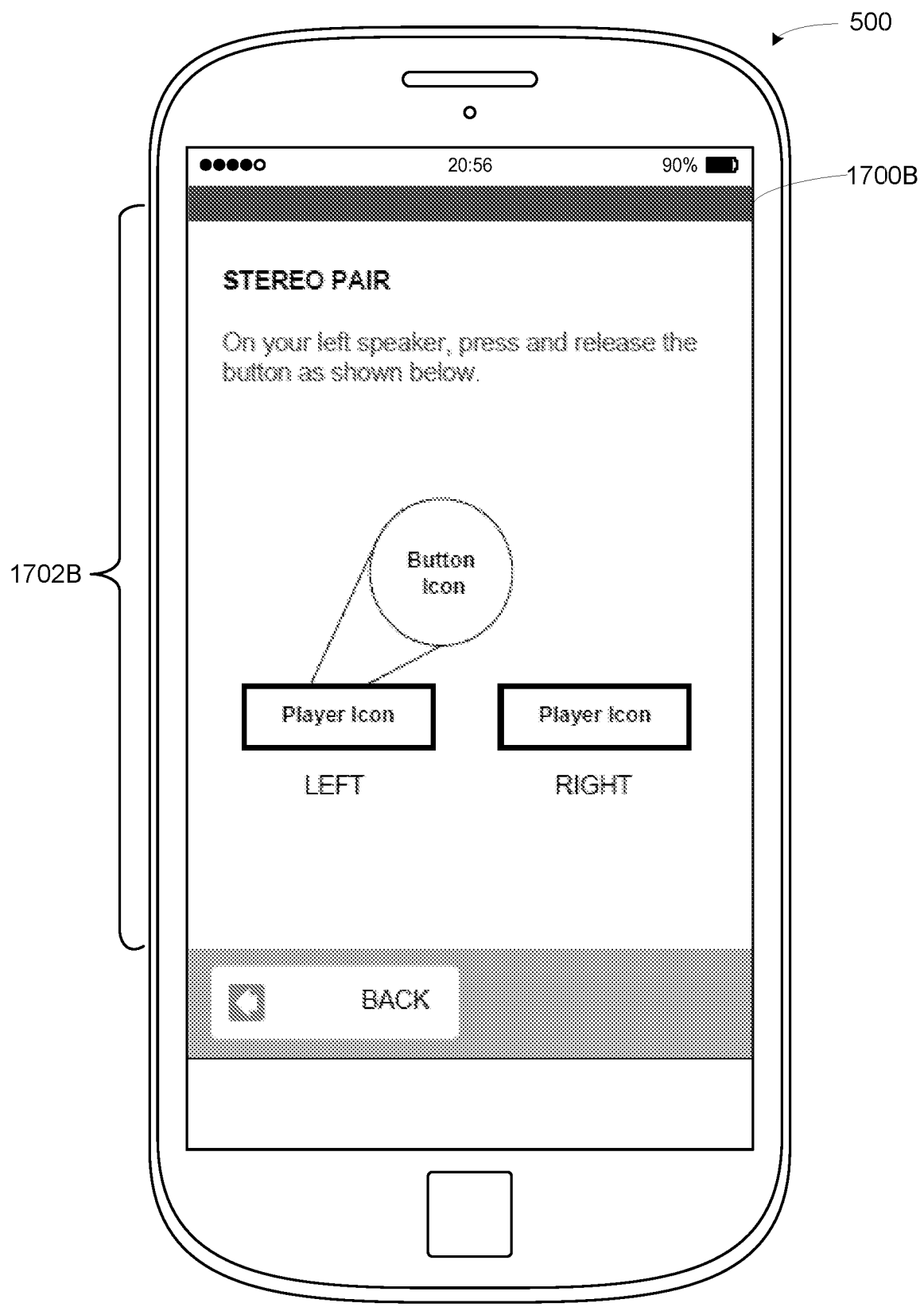
FIG. 17B shows a control device that is displaying an example control interface, according to the example implementation.
Figure 17C:
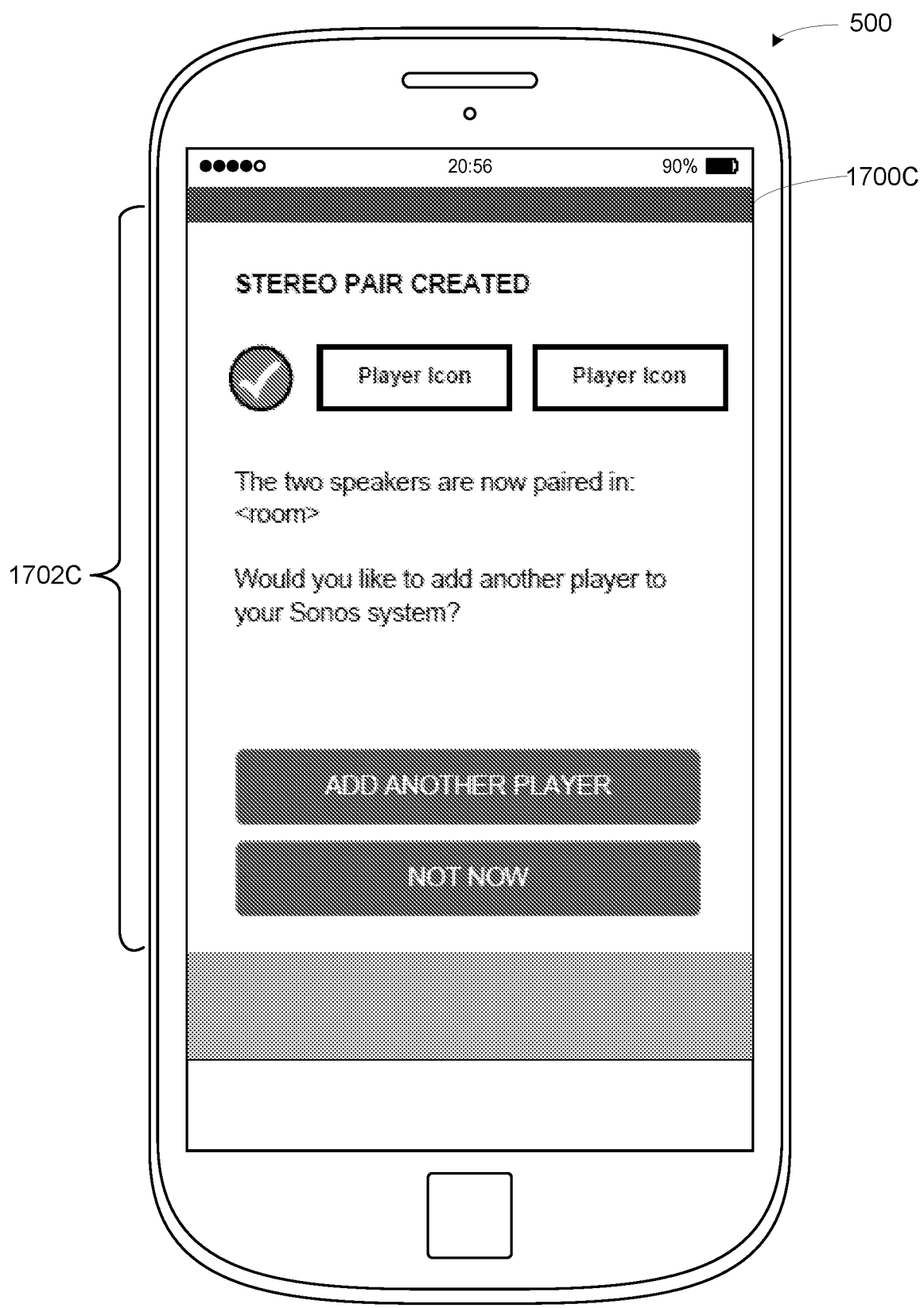
FIG. 17C shows a control device that is displaying an example control interface, according to the example implementation.

By way of example, continued setup of the stereo pair may involve further configuration of the stereo pair. For instance, continued setup of the stereo pair may involve setting respective channels of the stereo pair (i.e., left and right channels). To illustrate, FIG. 17B depicts an example control interface 1700B as displayed by smartphone 500. Control interface 1700B includes a graphical region 1702B prompting input on the playback device that will be used as the left channel of the stereo pair. After one playback device of the stereo pair is configured as the left channel, the other playback device may configured as the right channel. Upon completing setup of the stereo pair, the media playback system may indicate that setup is complete. For instance, FIG. 17C depicts an example control interface 1700C as displayed by smartphone 500. Control interface 1700C includes a graphical region 1702C indicating that setup of the stereo pair is complete and prompting setup of another playback device, if desired.

Figure 18A:
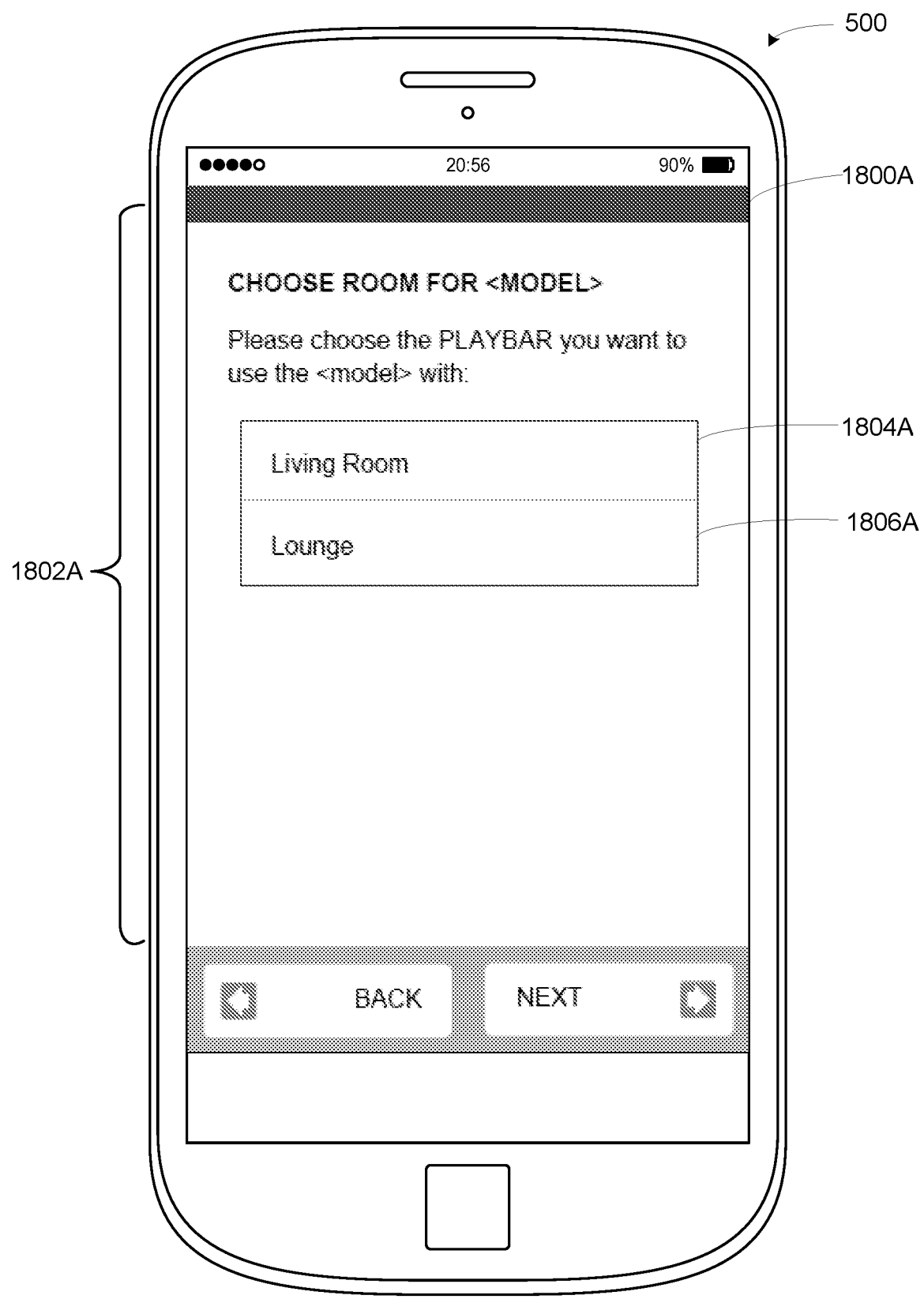
FIG. 18A shows a control device that is displaying an example control interface, according to an example implementation.

In some examples, detecting selection of a particular zone may involve detecting selection of two or more particular second device with which the first playback device will form a surround sound configuration. To illustrate, FIG. 18A depicts an example control interface 1800A as displayed by smartphone 500. Control interface 1800A includes a graphical region 1802A indicating playbar-type devices of a media playback system. Each indicated playbar corresponds to a playback device that is compatible with a surround sound configuration. In particular, graphical region includes graphical elements 1804A and 1806A. Selection of a particular one of these graphical elements continues setup of the surround sound configuration with the playback devices of the selected zone.

Figure 18B:
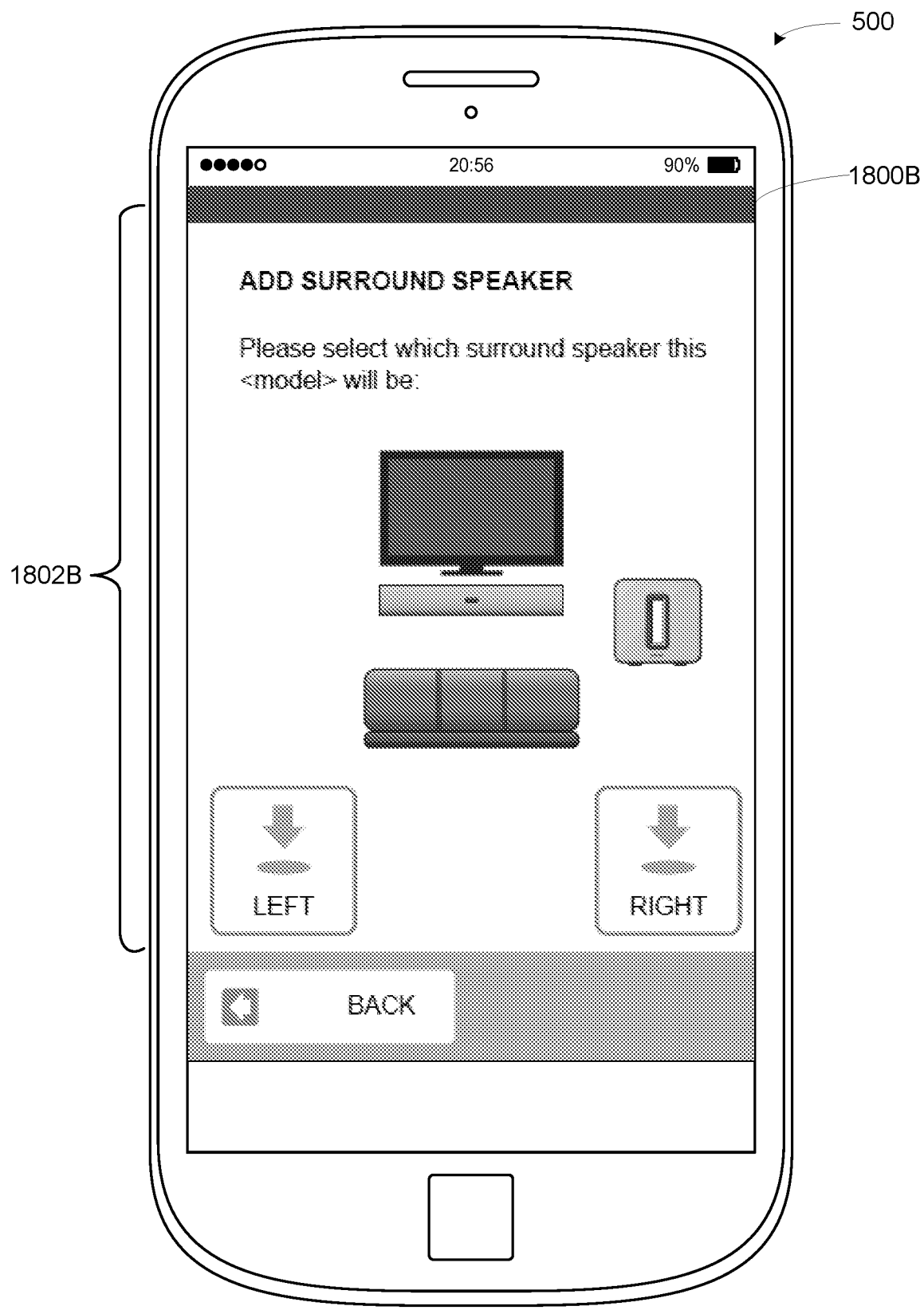
FIG. 18B shows a control device that is displaying an example control interface, according to the example implementation.
Figure 18C:
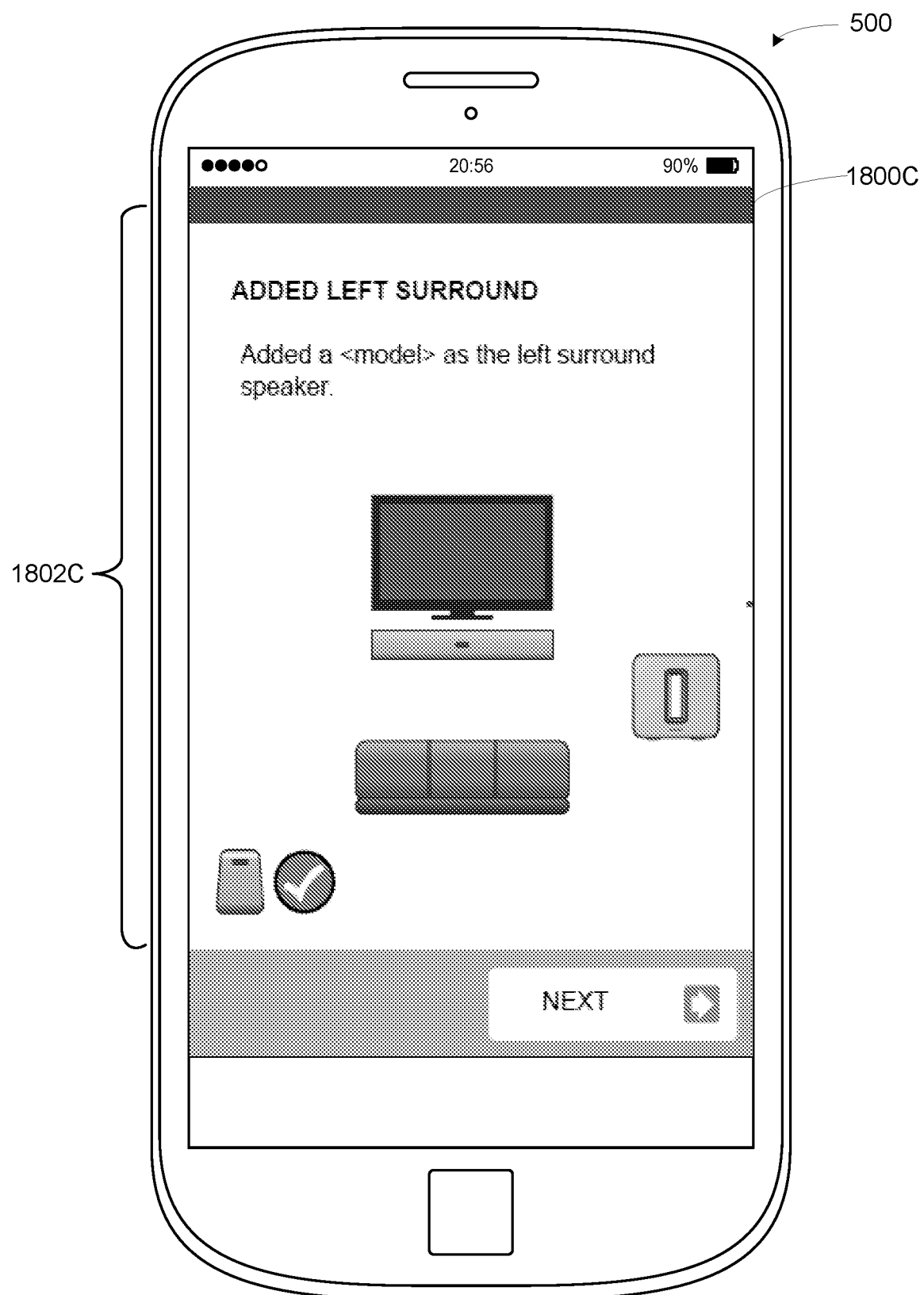
FIG. 18C shows a control device that is displaying an example control interface, according to the example implementation.
Figure 18D:
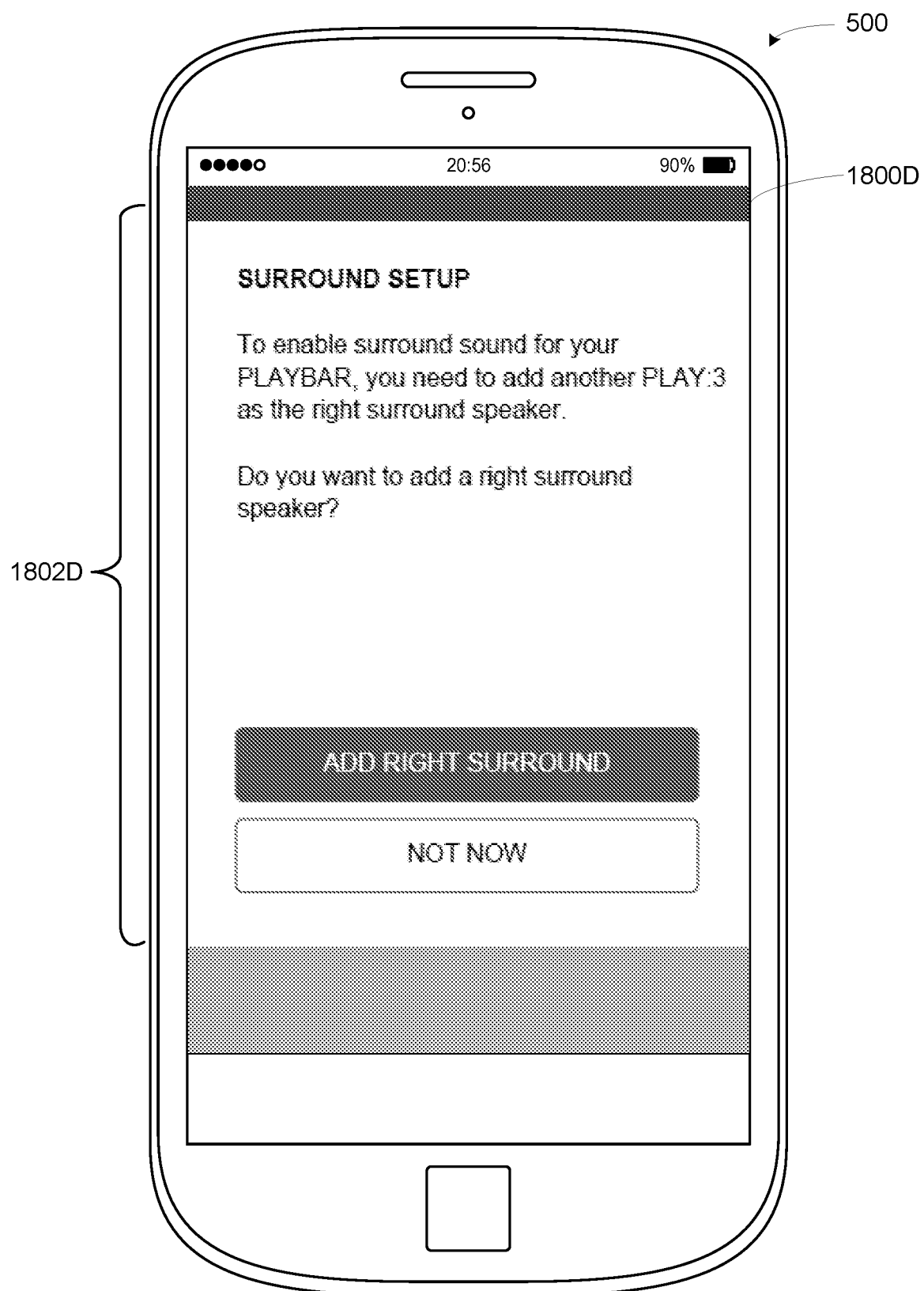
FIG. 18D shows a control device that is displaying an example control interface, according to the example implementation.

Continued setup of the surround sound configuration may involve further configuration. For instance, continued setup of the stereo pair may involve setting respective channels of the surround sound configuration (i.e., left, right, center, and surround channels). To illustrate, FIG. 18B depicts an example control interface 1800B as displayed by smartphone 500. Control interface 1800B includes a graphical region 1802B prompting selection of the playback device that will be used as the left surround channel of the surround sound configuration. Successful configuration of the channels may be indicated via a display. FIG. 18C depicts an example control interface 1800C as displayed by smartphone 500. Control interface 1800C includes a graphical region 1802C indicating that the left surround channel of the surround sound configuration was added. During setup, other channels of the surround sound configuration may be configured as well. For example, FIG. 18D depicts an example control interface 1800D as displayed by smartphone 500. Control interface 1800D includes a graphical region 1802D prompting setup of a right surround speaker. Other configuration may be possible as well.

As further examples, continuing the first and second example above, a control device of media playback system 100 may detect selection of particular playback devices from among the compatible devices. For instance, in the first example, control device 126 may detect selection of playback device 124 from among playback devices 112, 114, and 124, perhaps by detecting selection of the "Master Bedroom" zone. Similarly, in the second example, control device 126 may detect selection of playback device 104, playback device 108, and playback device 110, possibly by detecting selection of the "Living Room" zone.

g. Form the Selected Bonded Zone Configuration with the First Playback Device and the Selected Particular Second Playback Device(s)

Referring back to FIG. 14, at block 1414, implementation 1400 involves forming the first playback device to form the selected bonded zone configuration with the first playback device and the selected particular second playback device(s). For instance, the media playback system may cause the first playback device and the selected particular second playback device(s) to operate as the selected bonded zone configuration.

Within examples, a control device may send instruction(s) that cause the first playback device and a particular second playback device to form a stereo pair configuration such that the first playback device is configured as a first channel of the stereo pair (e.g., a left channel) and the particular second playback device is configured as a second channel of the stereo pair. When media items (e.g., audio tracks) are played back by the stereo pair, each playback device may output its respective channel.

As another example, a control device may send instruction(s) that cause the first playback device and two or more second playback device to form a surround sound configuration. In a surround sound configuration, each playback device is configured as one or more channels of the surround sound configuration. For instance, a playbar-type device may be configured as the left, center and right channels while other playback devices are configured as surround channels. Alternatively, each playback device may be configured as a respective channel. When multi-channel media is played back by the surround sound configuration, each playback device may output its respective channel(s).

Continuing the first and second examples, after detecting selection of particular playback devices from among the compatible devices, media playback system 100 may form the selected configurations. For instance, in the first example, control device 126 may instruct playback device 122 and playback device 124 to form a stereo pair in the "Master Bedroom" zone. Similarly, in the second example, control device 126 may instruct playback devices 104, 106, 108, and 110 to form the surround sound configuration in the "Living Room" zone.

As noted above, in some examples, the playback device is a specialized device that might be compatible with a subset of configurations. For instance, a subwoofer might be operable as part of a bonded zone configuration with at least one full-range playback device. In some example implementations, when a media playback system receives an indication that a subwoofer is available for configuration, the media playback system might not prompt for selection of bonded zone configurations and/or independent operation. Instead, the media playback system may prompt selection of the particular playback device(s) (or zone) with which to join the subwoofer device.

Figure 19A:
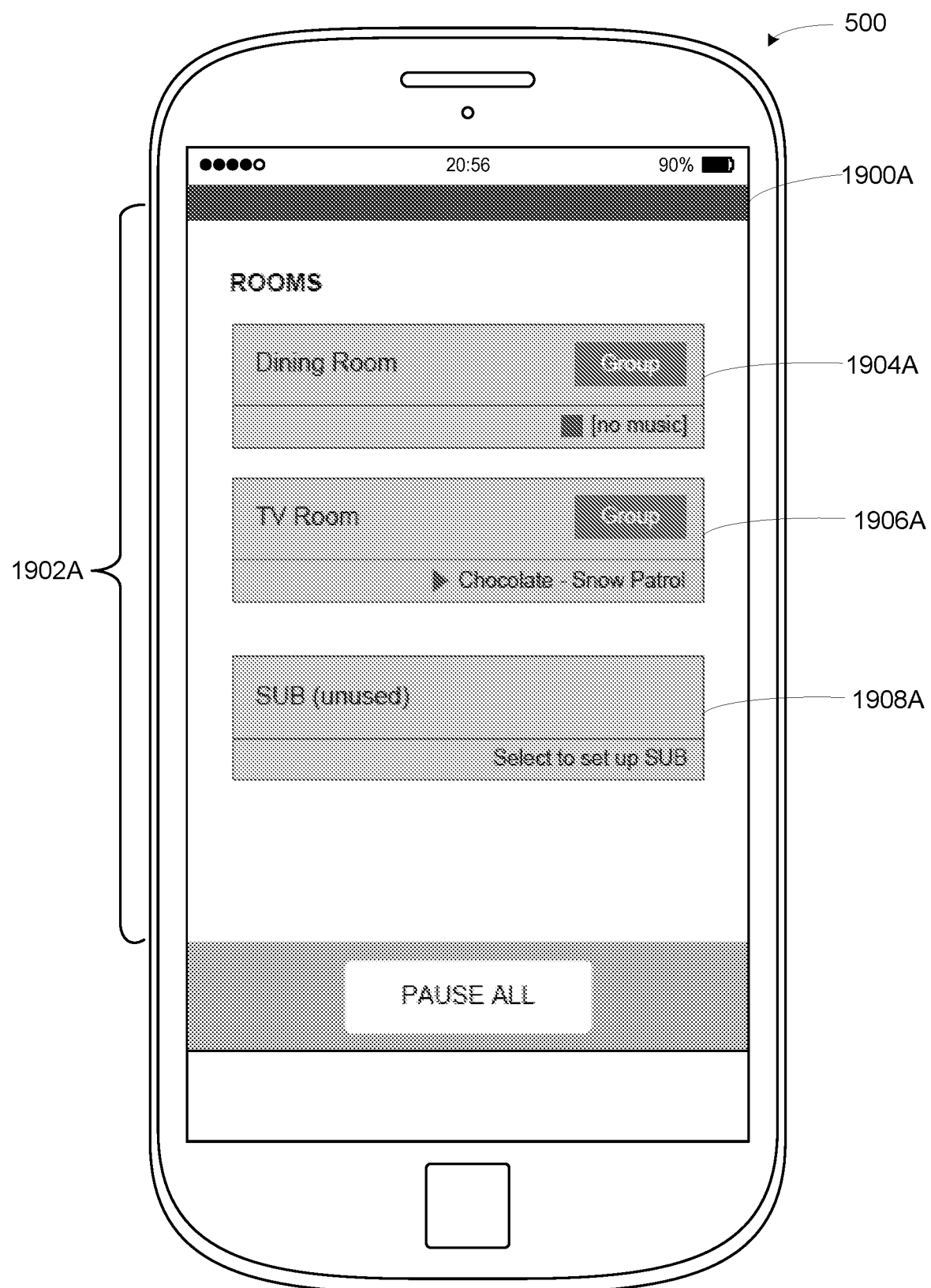
FIG. 19A shows a control device that is displaying an example control interface, according to an example implementation.

To illustrate, FIG. 19A depicts an example control interface 1900A as displayed by smartphone 500. Control interface 1900A includes a graphical region 1902A indicating both unconfigured playback devices and configured playback devices of a media playback system. Within graphical region 1902A are graphical elements 1904A, 1906A, and 1908A, which indicate respective devices or groups of devices. Graphical element 1908C indicates an unconfigured subwoofer-type playback device (a SONOS® SUB).

Figure 19B:
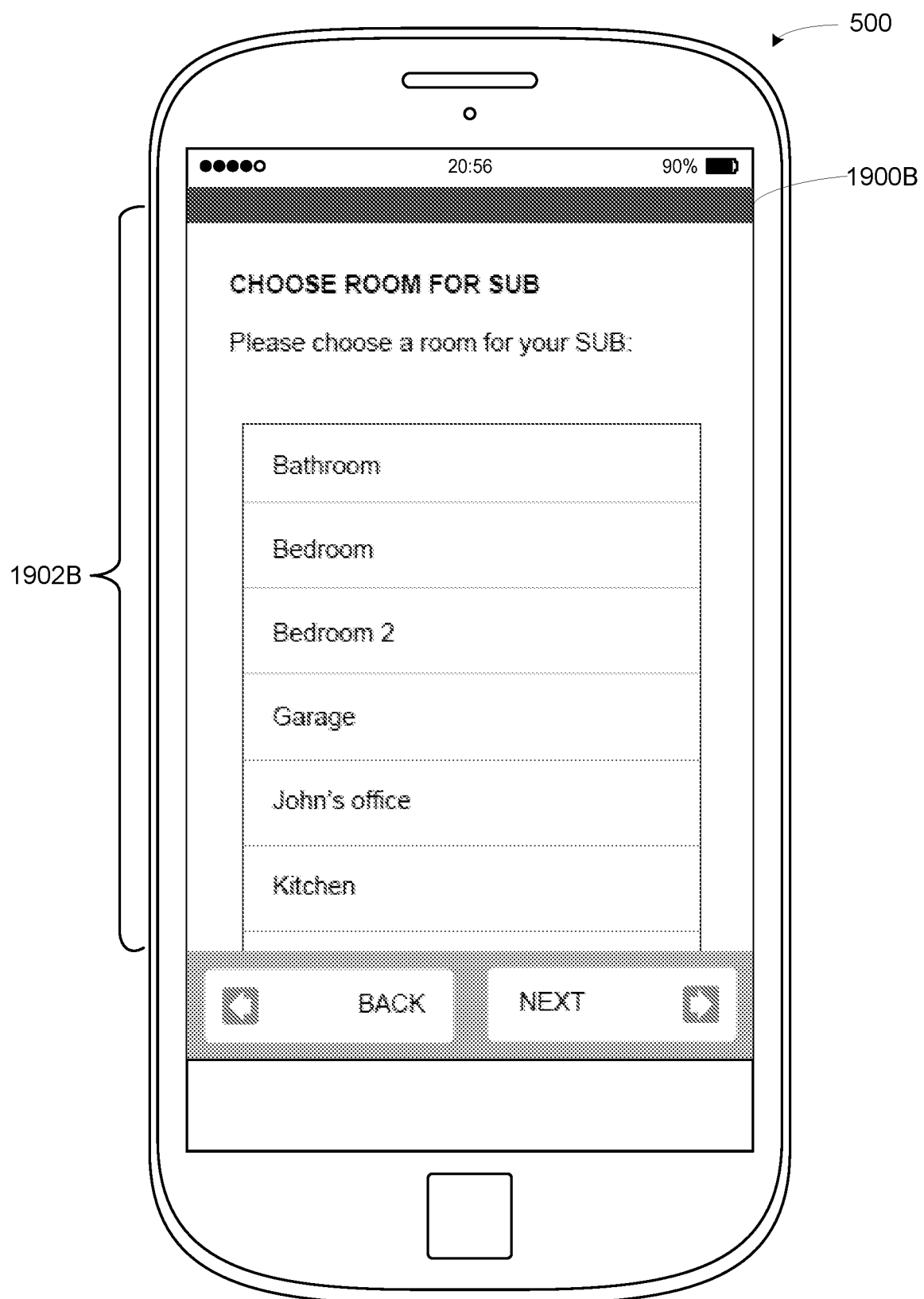
FIG. 19B shows a control device that is displaying an example control interface, according to the example implementation.

Selection of graphical element 1908A may cause smartphone 500 to display one or more prompts (e.g., one or more control interfaces) to configure the playback device in a bonded zone configuration with one or more previously configured playback device of the media playback system. For instance, FIG. 19B depicts an example control interface 1900B as displayed by smartphone 500. FIG. 19B depicts an example control interface 1900B as displayed by smartphone 500. Control interface 1900B includes a graphical region 1902B indicating zones of a media playback system as respective graphical elements. Each indicated zone corresponds to one or more particular playback devices that are compatible with the subwoofer-type playback device. Selection of a particular one of these graphical elements continues setup of the subwoofer with the playback device(s) of the selected zone.

VI. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

As noted above, example techniques may involve identifying a playback device. In one aspect, a method is provided. The method may involve detecting two or more playback devices of a given type. The method may further involve transmitting, to a particular playback device of the detected playback devices, an instruction that causes the particular playback device to emit a given sound. The method may also involve receiving an identification of the particular playback device and displaying, via a graphical interface, one or more prompts to join the particular playback device into the media playback system.

In another aspect, a device is provided. The device includes a network interface, at least one processor, a data storage, and program logic stored in the data storage and executable by the at least one processor to perform operations. The operations may include detecting two or more playback devices of a given type. The operations may further include transmitting, to a particular playback device of the detected playback devices, an instruction that causes the particular playback device to emit a given sound. The operations may also include receiving an identification of the particular playback device and displaying, via a graphical interface, one or more prompts to join the particular playback device into the media playback system.

In yet another aspect, a non-transitory computer readable memory is provided. The non-transitory computer readable memory has stored thereon instructions executable by a computing device to cause the computing device to perform operations. The operations may include detecting two or more playback devices of a given type. The operations may further include transmitting, to a particular playback device of the detected playback devices, an instruction that causes the particular playback device to emit a given sound. The operations may also include receiving an identification of the particular playback device and displaying, via a graphical interface, one or more prompts to join the particular playback device into the media playback system.

Further example techniques may involve identifying and/or suggesting one or more playback device groupings. In one aspect, a method is provided. The method may involve receiving one or more messages indicating that a first playback device is available for configuration into a zone of a media playback system. The method may further involve identifying one or more second playback devices that are connected to a network and determining that the first playback device and the one or more second playback devices are compatible with one or more bonded zone configurations. The method may also involve detecting selection of a bonded zone configuration from among the one or more compatible bonded zone configurations and displaying an indication of one or more particular second playback devices that are compatible with the selected bonded zone configuration. The method may involve detecting selection of at least one particular second playback device from among the one or more particular second playback devices that are compatible with the selected bonded zone configuration and causing the first playback device to form the selected bonded zone configuration with the selected at least one particular second playback device.

In another aspect, a device is provided. The device includes a network interface, at least one processor, a data storage, and program logic stored in the data storage and executable by the at least one processor to perform operations. The operations may include receiving one or more messages indicating that a first playback device is available for configuration into a zone of a media playback system. The operations may further include identifying one or more second playback devices that are connected to a network and determining that the first playback device and the one or more second playback devices are compatible with one or more bonded zone configurations. The operations may also include detecting selection of a bonded zone configuration from among the one or more compatible bonded zone configurations and displaying an indication of one or more particular second playback devices that are compatible with the selected bonded zone configuration. The operations may include detecting selection of at least one particular second playback device from among the one or more particular second playback devices that are compatible with the selected bonded zone configuration and causing the first playback device to form the selected bonded zone configuration with the selected at least one particular second playback device.

In yet another aspect, a non-transitory computer readable memory is provided. The non-transitory computer readable memory has stored thereon instructions executable by a computing device to cause the computing device to perform operations. The operations may include receiving one or more messages indicating that a first playback device is available for configuration into a zone of a media playback system. The operations may further include identifying one or more second playback devices that are connected to a network and determining that the first playback device and the one or more second playback devices are compatible with one or more bonded zone configurations. The operations may also include detecting selection of a bonded zone configuration from among the one or more compatible bonded zone configurations and displaying an indication of one or more particular second playback devices that are compatible with the selected bonded zone configuration. The operations may include detecting selection of at least one particular second playback device from among the one or more particular second playback devices that are compatible with the selected bonded zone configuration and causing the first playback device to form the selected bonded zone configuration with the selected at least one particular second playback device.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A tangible, non-transitory computer-readable medium having stored therein instructions, wherein the instructions, when executed by one or more processors, cause a control device of an environment that includes one or more playback devices configured to playback streamed audio content to perform operations comprising:
   detecting a particular playback device;
   after detecting the particular playback device, transmitting an instruction that causes the particular playback device to output a user-identifiable indication;
   after the particular playback device has output the user-identifiable indication, receiving user-assisted information associated with the particular playback device, wherein the user-assisted information associated with the particular playback device comprises identifying information for the particular playback device; and
   after receiving the user-assisted information associated with the particular playback device, causing the particular playback device to operate in a grouped configuration with one or more other playback devices of a media playback system for playback of audio content.

2. The tangible, non-transitory computer-readable medium of claim 1, wherein the grouped configuration comprises a stereo pair configuration.

3. The tangible, non-transitory computer-readable medium of claim 1, wherein the grouped configuration comprises a surround sound configuration.

4. The tangible, non-transitory computer-readable medium of claim 3, wherein the operations further comprise configuring the particular playback device to play one or more channels of the surround sound configuration.

5. The tangible, non-transitory computer-readable medium of claim 1, wherein the identifying information for the particular playback device comprises a serial number for the particular playback device received from a user.

6. The tangible, non-transitory computer-readable medium of claim 1, wherein the identifying information for the particular playback device comprises information associated with a button on the particular playback device that was pressed by a user.

7. The tangible, non-transitory computer-readable medium of claim 1, wherein the identifying information for the particular playback device comprises identifying information for the particular playback device obtained based on user action performed with a phone having a camera.

8. The tangible, non-transitory computer-readable medium of claim 7, wherein the identifying information for the particular playback device obtained based on the user action performed with the phone having the camera comprises a serial number for the particular playback device that was received via the phone from the user.

9. The tangible, non-transitory computer-readable medium of claim 1, wherein outputting the user-identifiable indication comprises emitting one or more sounds from the particular playback device.

10. The tangible, non-transitory computer-readable medium of claim 1, wherein outputting the user-identifiable indication comprises illuminating an LED of the particular playback device.

11. A control device that operates in an environment that includes one or more playback devices configured to playback streamed audio content, wherein the control device comprises:
   one or more processors; and
   tangible, non-transitory computer-readable media having stored therein instructions executable by the one or more processors to cause the control device to perform operations comprising:
   detecting a particular playback device;
   after detecting the particular playback device, transmitting an instruction that causes the particular playback device to output a user-identifiable indication;
   after the particular playback device has output the user-identifiable indication, receiving user-assisted information associated with the particular playback device, wherein the user-assisted information associated with the particular playback device comprises identifying information for the particular playback device; and
   after receiving the user-assisted information associated with the particular playback device, causing the particular playback device to operate in a grouped configuration with one or more other playback devices of a media playback system for playback of audio content.

12. The control device of claim 11, wherein the grouped configuration comprises a stereo pair configuration.

13. The control device of claim 11, wherein the grouped configuration comprises a surround sound configuration.

14. The control device of claim 13, wherein the operations further comprise configuring the particular playback device to play one or more channels of the surround sound configuration.

15. The control device of claim 11, wherein the identifying information for the particular playback device comprises a serial number for the particular playback device received from a user.

16. The control device of claim 11, wherein the identifying information for the particular playback device comprises information associated with a button on the particular playback device that was pressed by a user.

17. The control device of claim 11, wherein the identifying information for the particular playback device comprises identifying information for the particular playback device obtained based on user action performed with a phone having a camera.

18. The control device of claim 17, wherein the identifying information for the particular playback device obtained based on the user action performed with the phone having the camera comprises a serial number for the particular playback device that was input into the phone by the user.

19. The control device of claim 11, wherein outputting the user-identifiable indication comprises emitting one or more sounds from the particular playback device.

20. The control device of claim 11, wherein outputting the user-identifiable indication comprises illuminating an LED of the particular playback device.

* * * * *